United States Patent
Kishioka et al.

(10) Patent No.: US 9,695,337 B2
(45) Date of Patent: Jul. 4, 2017

(54) OPTICAL PRESSURE-SENSITIVE ADHESIVE SHEET, OPTICAL FILM AND DISPLAY DEVICE

(75) Inventors: Hiroaki Kishioka, Osaka (JP); Masatomo Natsui, Osaka (JP); Hiroaki Fumoto, Osaka (JP)

(73) Assignee: NITTO DENKO CORPORATION, Osaka (JP)

( * ) Notice: Subject to any disclaimer, the term of this patent is extended or adjusted under 35 U.S.C. 154(b) by 799 days.

(21) Appl. No.: 13/277,906

(22) Filed: Oct. 20, 2011

(65) Prior Publication Data
US 2012/0100359 A1 Apr. 26, 2012

(30) Foreign Application Priority Data
Oct. 21, 2010 (JP) ................... 2010-236316

(51) Int. Cl.
*C09J 7/00* (2006.01)
*C09J 133/08* (2006.01)
(Continued)

(52) U.S. Cl.
CPC ........... *C09J 7/0217* (2013.01); *C09J 133/08* (2013.01); *C09J 133/12* (2013.01); *C09J 133/14* (2013.01); *C09J 133/24* (2013.01); *C09J 2201/606* (2013.01); *C09J 2203/318* (2013.01); *C09J 2433/00* (2013.01)

(58) Field of Classification Search
None
See application file for complete search history.

(56) References Cited

U.S. PATENT DOCUMENTS

| | | | |
|---|---|---|---|
| 6,013,722 A | 1/2000 | Yang et al. | |
| 6,552,118 B2 * | 4/2003 | Fujita | C08F 8/42 106/287.1 |

(Continued)

FOREIGN PATENT DOCUMENTS

| | | |
|---|---|---|
| CN | 1284106 A | 2/2001 |
| JP | 2002-501106 A | 1/2002 |

(Continued)

OTHER PUBLICATIONS

Human translation of JP 2004263084 A (2004).*

(Continued)

*Primary Examiner* — Frank D Ducheneaux
(74) *Attorney, Agent, or Firm* — Sughrue Mion, PLLC

(57) ABSTRACT

The present invention provides an optical pressure-sensitive adhesive sheet in which white turbidity is not caused by humidification and durability is excellent as well. The present invention provides an optical pressure-sensitive adhesive sheet, comprising: a pressure-sensitive adhesive layer in which a moisture ratio after storage under an environment of 60° C. and 95% RH for 120 hours is 0.65 wt % or more, and a shear storage elastic modulus at 85° C. which is measured by a dynamic viscoelastic measurement is $5.0 \times 10^4$ to $5.0 \times 10^5$ Pa, wherein a peeling distance measured by the constant-load peel test is 30 mm or less when an adherend is a polyethylene terephthalate plate, and the peeling distance measured by the following constant-load peel test is 30 mm or less when the adherend is an acrylic plate.

12 Claims, 4 Drawing Sheets

(51) Int. Cl.
*C09J 133/14* (2006.01)
*C09J 133/24* (2006.01)
*C09J 133/12* (2006.01)
*C09J 7/02* (2006.01)

(56) References Cited

U.S. PATENT DOCUMENTS

| | | | |
|---|---|---|---|
| 6,558,790 B1* | 5/2003 | Holguin | C09J 4/00 428/317.1 |
| 6,824,839 B1* | 11/2004 | Popat et al. | 428/32.12 |
| 7,070,051 B2* | 7/2006 | Kanner et al. | 206/382 |
| 8,361,633 B2 | 1/2013 | Everaerts et al. | |
| 8,663,811 B2 | 3/2014 | Everaerts et al. | |
| 2001/0019766 A1* | 9/2001 | Masuda et al. | 428/345 |
| 2003/0232192 A1 | 12/2003 | Kishioka et al. | |
| 2004/0191509 A1 | 9/2004 | Kishioka et al. | |
| 2005/0065252 A1 | 3/2005 | Kawamura et al. | |
| 2007/0218276 A1* | 9/2007 | Hiramatsu et al. | 428/354 |
| 2010/0086706 A1 | 4/2010 | Everaerts et al. | |
| 2010/0215955 A1* | 8/2010 | Kishioka | 428/355 AC |
| 2012/0282479 A1 | 11/2012 | Everaerts et al. | |

FOREIGN PATENT DOCUMENTS

| | | |
|---|---|---|
| JP | 2003-238915 A | 8/2003 |
| JP | 2003-342542 A | 12/2003 |
| JP | 2004-231723 A | 8/2004 |
| JP | 2004-263084 A | 9/2004 |
| JP | 2006-96776 A | 4/2006 |
| JP | 2008-222967 A | 9/2008 |
| JP | 2012-504512 A | 2/2012 |
| TW | 201026509 A1 | 7/2010 |
| WO | 2009/031548 A1 | 3/2009 |
| WO | 2009/031598 A1 | 3/2009 |

OTHER PUBLICATIONS

Communication issued Aug. 27, 2013, by the Japan Patent Office in corresponding Japan Application No. 2010-236316 regarding Third Party Observation.
Office Action, dated Nov. 26, 2013, issued by the Japanese Patent Office, in counterpart Application No. 2010-236316.
Office Action, dated Dec. 4, 2013, issued by the State Intellectual Property Office of the People's Republic of China, in counterpart Application No. 201110320338.1.
Office Action dated Jan. 8, 2013 issued by the Japanese Patent Office in counterpart Japanese Application No. 2010-236316.
Office Action dated Dec. 23, 2014 issued by the Intellectual Property Office of Taiwan in counterpart Taiwanese Patent Application No. 100138350.
Office Action issued Aug. 10, 2015, issued by the Intellectual Property Office of Taiwan in counterpart Taiwanese Patent Application No. 100138350.
Communication dated Apr. 7, 2016 issued by European Patent Office in counterpart European Patent Application No. 11185945.0.

\* cited by examiner

OPTICAL PRESSURE-SENSITIVE ADHESIVE SHEET, OPTICAL FILM AND DISPLAY DEVICE

BACKGROUND OF THE INVENTION

Technical Field

The present invention relates to an optical pressure-sensitive adhesive sheet. More particularly, the present invention relates to an optical pressure-sensitive adhesive sheet used in lamination of an optical member, manufacture of an optical product, or the like. Further, the present invention relates to an optical film and a display device which includes the optical pressure-sensitive adhesive sheet.

Background Art

Recently, in various fields, display devices such as a liquid crystal display (LCD) or an input device such as a touch panel, which is used by combining with the display device has been widely used. In manufacturing of the display device or the input device, a transparent pressure-sensitive adhesive sheet (pressure-sensitive adhesive tape) is used for laminating an optical member. For example, the transparent pressure-sensitive adhesive sheet is used for laminating the touch panel and various display devices or optical members (e.g., a protective plate) (for example, see Patent Documents 1 to 3).

As the application of the display device or input device is expanded, the pressure-sensitive adhesive sheet used in these devices requires not only to have transparency but also to sufficiently exhibit characteristics as the pressure-sensitive adhesive sheet under various environments. For example, adhesive reliability at a high temperature, such as a high pressure-sensitive adhesion property at a high temperature or a property that does not generate foam or release at a high temperature (antifoaming release property), is required. For example, like a cellular phone having a waterproof function, in the pressure-sensitive adhesive sheet in products used even under humidified conditions (for example, high temperature and high humidity condition), it is required that white turbidity should not occur, an appearance of the display device or input device should not be degraded, and visibility of a display part of the display device should not be decreased, due to humidification.

In response to the above requirements, a pressure-sensitive adhesive in which white turbidity caused by the humidification is suppressed has been proposed (see Patent Document 4). However, although the pressure-sensitive adhesive sheet including the pressure-sensitive adhesive does not deteriorate the appearance or visibility of the display device or input device, there is a problem in that adhesive reliability is decreased at a high temperature because the pressure-sensitive adhesive force is insufficient at a high temperature, thereby causing foam or release.

Patent Document 1: JP 2003-238915 A
Patent Document 2: JP 2003-342542 A
Patent Document 3: JP 2004-231723 A
Patent Document 4: JP 2004-263084 A

SUMMARY OF THE INVENTION

In respect to the above problem, a design of a pressure-sensitive adhesive sheet, in which adhesive reliability is excellent at a high temperature and white turbidity due to humidification is suppressed, has been made. However, the pressure-sensitive adhesive sheet has been mainly designed in consideration of suppressing white turbidity, and, as a result, the pressure-sensitive adhesive sheet has poor durability such as an occurrence of foam or release under a high temperature condition (in particular, high temperature and high humidity condition) depending on a material of an adherend or an atmosphere condition, in some cases. That is, the pressure-sensitive adhesive sheet in which white turbidity does not occur by humidification and durability is excellent as well, has not yet been obtained.

The present invention has been made in an effort to provide an optical pressure-sensitive adhesive sheet in which white turbidity is not caused by humidification and durability is excellent as well. Further, the present invention has been made in an effort to provide an optical pressure-sensitive adhesive sheet having excellent corrosion resistance.

Accordingly, the present inventors have studied in order to solve the problems. As a result, the inventors have found out that an optical pressure-sensitive adhesive sheet being capable of suppressing white turbidity caused by humidification and having excellent durability can be obtained by using an optical pressure-sensitive adhesive sheet, including a pressure-sensitive adhesive layer in which a moisture ratio after storage under an environment of 60° C. and 95% RH for 120 hours and a shear storage elastic modulus at 85° C. are controlled to a predetermined range, in which a peeling distance measured by the constant-load peel test when an adherend is a polyethyleneterephthalate plate, and the peeling distance when the adherend is an acrylic plate, are controlled to a predetermined range. The present disclosure has been completed based on these foundings.

That is, the present invention provides an optical pressure-sensitive adhesive sheet, comprising: a pressure-sensitive adhesive layer in which a moisture ratio after storage under an environment of 60° C. and 95% RH for 120 hours is 0.65 wt % or more, and a shear storage elastic modulus at 85° C. which is measured by a dynamic viscoelastic measurement is $5.0 \times 10^4$ to $5.0 \times 10^5$ Pa, wherein a peeling distance measured by the constant-load peel test is 30 mm or less when an adherend is a polyethylene terephthalate plate, and the peeling distance measured by the following constant-load peel test is 30 mm or less when the adherend is an acrylic plate.

The constant-load peel test is as follows: a surface of the pressure-sensitive adhesive layer of the pressure-sensitive adhesive sheet having a size of 20 mm in width and 60 mm in length is laminated to one surface of the adherend, followed by treating in an autoclave under a condition of 50° C. and 5 atm for 15 min, and subsequently, a load of 100 gf in a direction which is vertical to the surface of the adherend is applied to an end of the pressure-sensitive adhesive sheet in a length direction under a condition of 23° C. and 50% RH, and the peeling distance of the pressure-sensitive adhesive sheet after the passage of 3 hours is measured.

In the optical pressure-sensitive adhesive sheet, it is preferred that a total amount of an acrylic acid ion and methacrylic acid ion which are extracted with pure water under a condition of 100° C. and 45 min, which is measured by an ion chromatograph method, is 20 ng/cm² or less per unit area of the pressure-sensitive adhesive layer.

In the optical pressure-sensitive adhesive sheet, it is preferred that a gel fraction of the pressure-sensitive adhesive layer is 40 to 95%.

In the optical pressure-sensitive adhesive sheet, it is preferred that the pressure-sensitive adhesive layer comprises an acrylic polymer including, as a monomer component, a methyl methacrylate in an amount of 5 to 20 wt % based on a total amount (100 wt %) of the monomer component constituting the acrylic polymer.

In the optical pressure-sensitive adhesive sheet, it is preferred that the acrylic polymer includes, as a monomer component, a hydroxyl group-containing monomer in an amount of 10 to 25 wt % based on a total amount (100 wt %) of the monomer component constituting the acrylic polymer.

In addition, the invention provides an optical film comprising the optical pressure-sensitive adhesive sheet.

In addition, the invention provides a display device comprising the optical pressure-sensitive adhesive sheet.

Since the optical pressure-sensitive adhesive sheet of the present invention has the above constitution, the sheet does not have white turbidity caused by humidification. Further, even under the high temperature environment, in particular, even under a high temperature and high humidity environment, foaming or releasing does not occur, and durability is excellent. Accordingly, if the optical pressure-sensitive adhesive sheet of the present invention is used, a phenomenon such as white turbidity or foaming that may obscure visibility of a display part of a product such as an LCD or a touch panel to make an appearance poor does not occur, so that it is possible to obtain a beautiful optical member (for example, an optical film) or optical product (for example, a display device).

DETAILED DESCRIPTION OF THE INVENTION

Figure 1:
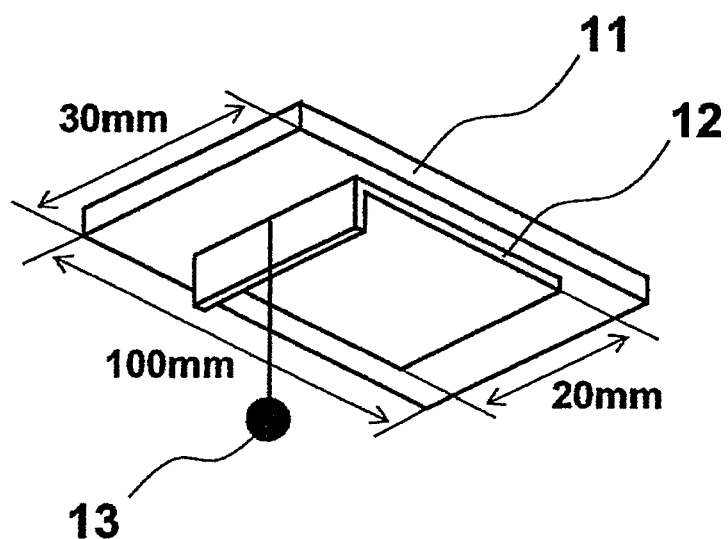
FIG. 1 is a schematic view (perspective view) showing the positional relationship among a test plate, a pressure-sensitive adhesive sheet and a weight in a constant-load peel test.

Hereinafter, exemplary embodiments of the present invention will be described in detail. In this regard, each of the terms "a" and "at least" used in this specification means "one or more" unless otherwise provided.

An optical pressure-sensitive adhesive sheet of the present invention (hereinafter, also called "pressure-sensitive adhesive sheet of the present invention" in some cases) includes a pressure-sensitive adhesive layer (hereinafter, also called "pressure-sensitive adhesive layer of the present invention" in some cases) in which a moisture ratio after storage under an environment of 60° C. and 95% RH for 120 hours is 0.65 wt % or more, and a shear storage elastic modulus at 85° C. which is measured by a dynamic viscoelastic measurement is $5.0 \times 10^4$ to $5.0 \times 10^5$ Pa.

The "pressure-sensitive adhesive sheet" in the present invention also includes a tape shaped sheet, that is, a 'pressure-sensitive adhesive tape'. Further, a surface of the pressure-sensitive adhesive layer of the pressure-sensitive adhesive sheet of the present invention may also be called a "pressure-sensitive adhesive surface" in some cases.

The pressure-sensitive adhesive sheet of the present invention may be a double-sided pressure-sensitive adhesive sheet having pressure-sensitive adhesive surfaces on both surfaces of the sheet, or a single-sided pressure-sensitive adhesive sheet having a pressure-sensitive adhesive surface on only one surface of the sheet. Among them, from the viewpoint of laminating two members, the pressure-sensitive adhesive sheet is preferably the double-sided pressure-sensitive adhesive sheet.

The pressure-sensitive adhesive sheet of the present invention may be a "substrateless type pressure-sensitive adhesive sheet" (hereinafter referred to as "substrateless pressure-sensitive adhesive sheet" in some cases) that does not have a substrate (substrate layer), or a pressure-sensitive adhesive sheet with a substrate. The substrateless pressure-sensitive adhesive sheet may be, for example, a double-sided pressure-sensitive adhesive sheet consisting of the pressure-sensitive adhesive layers of the present invention, a double-sided pressure-sensitive adhesive sheet including the pressure-sensitive adhesive layers of the present invention and a pressure-sensitive adhesive layer other than the pressure-sensitive adhesive sheet of the present invention (hereinafter, also referred to as "other pressure-sensitive adhesive layer" in some cases), and the like. The pressure-sensitive adhesive sheet with substrate may be, for example, a pressure-sensitive adhesive sheet including the pressure-sensitive adhesive layer of the present invention on at least one side of the substrate, and the like. Among the pressure-sensitive adhesive sheets, from the viewpoint of making thinner or improving optical properties such as transparency, the substrateless pressure-sensitive adhesive sheet is preferable, and the substrateless pressure-sensitive adhesive sheet (double-sided pressure-sensitive adhesive sheet) consisting of the pressure-sensitive adhesive layer of the present invention is more preferable.

(Pressure-Sensitive Adhesive Layer of the Present Invention)

In the pressure-sensitive adhesive layer of the present invention, the moisture ratio after (immediately after) storage under the environment of 60° C. and 95% RH for 120 hours is 0.65 wt % or more (for example, 0.65 to 5.0 wt %), preferably 0.65 to 3.0 wt %, and more preferably 0.75 to 3.0 wt %. By setting the moisture ratio to 0.65 wt % or more, since white turbidity of the pressure-sensitive adhesive sheet due to humidification does not occur, visibility or appearance of a display part of a product using the pressure-sensitive adhesive sheet is not deteriorated.

The white turbidity of a pressure-sensitive adhesive sheet caused by humidification appears to be a phenomenon that is caused by placing the pressure-sensitive adhesive sheet under high temperature and high humidity environment, which leads that the pressure-sensitive adhesive layer absorbs moisture and the absorbed moisture is condensed. In the present invention, the moisture ratio of the pressure-sensitive adhesive layer (moisture ratio after storage under the environment of 60° C. and 95% RH for 120 hours) is controlled to 0.65 wt % or more. Accordingly, for example, even in the case where the environment under which the pressure-sensitive adhesive sheet is used is largely changed (for example, a change from a high temperature and high humidity environment to a room temperature environment), the absorbed moisture is not easily condensed due to high water absorbability of the pressure-sensitive adhesive layer, and as a result, it is assumed that white turbidity caused by humidification is suppressed.

The moisture ratio is a value that is obtained by storing the pressure-sensitive adhesive layer of the present invention under the environment of 60° C. and 95% RH for 120 hours, and subsequently measuring immediately after (for example, about 0 to 10 min after taking out) taking out the layer under a room temperature environment (23° C. and 50% RH). Specifically, the moisture ratio of the pressure-sensitive adhesive layer of the present invention after storage under the environment of 60° C. and 95% RH for 120 hours can be, for example, measured by a method that is disclosed in the following section of "(Method for measuring moisture ratio)".

(Method for Measuring Moisture Ratio)

(Preparation of Sample and Measurement of Moisture Ratio)

About 0.2 g of the pressure-sensitive adhesive layer is taken out from the pressure-sensitive adhesive sheet of the present invention to use as a sample. Specifically, in the case where the pressure-sensitive adhesive sheet of the present invention is a substrateless type double-sided pressure-sensitive adhesive sheet, for example, the sample can be obtained by releasing the release liner, laminating an aluminum foil to one side of the pressure-sensitive adhesive surface, and cutting the layer so that the weight of the pressure-sensitive adhesive layer is about 0.2 g. In the case where the pressure-sensitive adhesive sheet of the present invention is a pressure-sensitive adhesive sheet with a substrate, for example, the sample can be obtained by collecting about 0.2 g of the pressure-sensitive adhesive layer from the pressure-sensitive adhesive sheet with the substrate.

After the sample is stored under the environment of 60° C. and 95% RH for 120 hours, the sample (after storage under the environment of 60° C. and 95% RH for 120 hours) is weighed, and subsequently put it in the following heating vaporization apparatus, and gas generated when heating at 150° C. is introduced into a titration cell of the following coulometric titration moisture measuring apparatus. By the coulometric titration moisture measuring apparatus, the moisture content (μg) of the sample is measured under the following measuring condition, the moisture content per 1 g of the pressure-sensitive adhesive layer of the present invention after storage under the environment of 60° C. and 95% RH for 120 hours (per 1 g of the weight besides the weight of the aluminum foil from the weight of the sample in the case of the double-sided pressure-sensitive adhesive sheet consisting of the pressure-sensitive adhesive layer of the present invention) is obtained, and the moisture ratio (wt %) of the pressure-sensitive adhesive layer is calculated. The number of measurements (n number) is preferably, for example, twice.

(Analysis Apparatus)

Heating vaporization apparatus: "VA-06 type" manufactured by Mitsubishi Chemical Corp.

Coulometric titration moisture measuring apparatus: "CA-06 type" manufactured by Mitsubishi Chemical Corp.

(Measuring Condition)

Method: heating vaporizition method/150° C. heating

Anode solution: Aquamicron AKX

Cathode solution: Aquamicron CXU

The moisture ratio can be controlled by a kind and mixing amount of monomers constituting the acrylic polymer, a kind and mixing amount of additives (in detail, a tackifier resin or an acrylic oligomer), or the like.

The shear storage elastic modulus at 85° C. of the pressure-sensitive adhesive layer of the present invention measured by the dynamic viscoelastic measurement (also referred to as "storage elastic modulus (85° C.)" or "G' (85° C.)" in some cases) is $5.0 \times 10^4$ to $5.0 \times 10^5$ Pa, preferably $5.0 \times 10^4$ to $3.0 \times 10^5$ Pa, and more preferably $5.0 \times 10^4$ to $1.0 \times 10^5$ Pa. By setting the shear storage elastic modulus (85° C.) to $5.0 \times 10^4$ Pa or more, high elastic modulus is maintained even at a high temperature, and thus, durability is improved. On the other hand, by setting the shear storage elastic modulus (85° C.) to $5.0 \times 10^5$ Pa or less, balanced performance (for example, step absorbability or lamination workability) is exhibited in the rage from a low temperature to normal temperature. The shear storage elastic modulus (85° C.) is measured by the dynamic viscoelastic measurement. For example, the shear storage elastic modulus can be measured by Advanced Rheometric Expansion System (ARES) manufactured by Rheometric Scientific Co., Ltd. in a shear mode under conditions of a frequency of 1 Hz, a temperature of −70° C. to 200° C., and a rising-temperature rate of 5° C./min, after laminating a plurality of pressure-sensitive adhesive layers of the present invention so as to have a thickness of about 1.5 mm.

The shear storage elastic modulus (85° C.) can be controlled by a monomer composition of an acrylic polymer, the weight average molecular weight of the acrylic polymer, an amount of the crosslinking agent used (added), and the presence or absence, kinds and amounts of additives (in detail, a tackifier resin or an acrylic oligomer).

The shear storage elasticity at 23° C. of the pressure-sensitive adhesive layer of the present invention measured by the dynamic viscoelastic measurement (also referred to as "shear storage elasticity (23° C.)" or "G' (23° C.)" in some cases) is not particularly limited, but is preferably $1.0 \times 10^5$ to $5.0 \times 10^5$ Pa, more preferably $1.0 \times 10^5$ to $4.0 \times 10^5$ Pa, and more preferably $1.5 \times 10^5$ to $4.0 \times 10^5$ Pa. By setting the shear storage elastic modulus (23° C.) to $1.0 \times 10^5$ Pa or more, the pressure-sensitive adhesive layer is prevented from excessively softening, for example, a problem of "adhesive protrusion" (a phenomenon where the pressure-sensitive adhesive layer is deformed and protruded from an end part of the laminated member at laminating) is decreased. On the other hand, by setting the shear storage elastic modulus (23° C.) to $5.0 \times 10^5$ Pa or less, step absorbability (step following property) is improved, and the occurrence of bubbles or lift-off at laminating is decreased. The "step absorbability" means a characteristic that when the pressure-sensitive adhesive layer is laminated to an adherend having a fine step (for example, print step) on the surface thereof, the pressure-sensitive adhesive layer follows the step to bury the step. The shear storage elastic modulus (23° C.) can be measured by the same method as in the shear storage elastic modulus (85° C.).

The shear storage elastic modulus (23° C.) can be controlled by the glass transition temperature of the acrylic polymer, the molecular weight (weight average molecular weight or molecular weight distribution) of the acrylic polymer, and the presence or absence, kinds and amounts of additives (in detail, a tackifier resin or an acrylic oligomer).

A gel fraction (solvent insoluble matter) of the pressure-sensitive adhesive layer of the present invention is not particularly limited, but is preferably 40% to 95% (wt %), and more preferably 50% to 90%, from the viewpoint of an improvement of durability (in particular, antifoaming release property). The gel fraction is measured as an insoluble matter in ethyl acetate, and in detail, as a weight fraction (unit: wt %) of an insoluble matter after the pressure-sensitive adhesive layer is immersed in ethyl acetate at 23° C. for 7 days with respect to the sample (pressure-sensitive adhesive layer) before immersing. When the gel fraction is 40% or more, the durability is improved. On the other hand, when the gel fraction is 95% or less, the release at an end part is lowered.

Specifically, the gel fraction is, for example, a value calculated by "Method of measuring gel fraction" to be described below.

(Method of Measuring Gel Fraction)

About 0.1 g of the pressure-sensitive adhesive layer is sampled from the double-sided pressure-sensitive adhesive sheet, wrapped with a porous tetrafluoroethylene sheet (trade name "NTF1122", manufactured by Nitto Denko Corporation) having an average pore size of 0.2 μm, and it is tied up with a kite string and at this time, it is measured for the weight, and the weight measured is designated as the weight before immersion. Incidentally, the weight before immersion is the total weight of the pressure-sensitive adhesive layer (pressure-sensitive adhesive sampled above), the tetrafluoroethylene sheet and the kite string. The total weight of the tetrafluoroethylene sheet and the kite string is also measured, and this weight is designated as the wrapper weight.

Subsequently, the pressure-sensitive adhesive layer of the present invention wrapped with a tetrafluoroethylene sheet and tied up with a kite string (hereinafter referred to as the "sample") is put in a 50 ml-volume vessel filled with ethyl acetate, followed by allowing to stand still at 23° C. for 7 days. The sample (after ethyl acetate treatment) is then taken out of the vessel, and it is transferred to an aluminum-made cup, followed by drying in a dryer at 130° C. for 2 hours to remove ethyl acetate, and it is measured for the weight, and this weight is designated as the weight after immersion.

The gel fraction is calculated according to the following formula:

Gel fraction (wt %)=((A−B)/(C−B))×100

(wherein A is the weight after immersion, B is the wrapper weight, and C is the weight before immersion).

The gel fraction can be controlled by the amount of the monomer used as a crosslinking point, the weight average molecular weight of the acrylic polymer, and the kind and amount of a crosslinking agent used (added).

The weight average molecular weight of the soluble matter (sol matter) (simply also called "sol matter" in some cases) in extraction of the ethyl acetate of the pressure-sensitive adhesive layer of the present invention is not particularly limited, but preferably 50,000 to 700,000, and more preferably 100,000 to 600,000. By setting the weight average molecular weight of the sol matter to 50,000 or more, a low molecular weight component existing in the pressure-sensitive adhesive layer is decreased, such that durability is improved. On the other hand, a coating property is improved by setting the weight average molecular weight of the sol matter to 700,000 or less.

The "weight average molecular weight of the soluble matter (sol matter) in extraction of ethyl acetate" is calculated by the following measurement method.

(Method for Measuring Weight Average Molecular Weight of Soluble Matter (Sol Matter) in Extraction of Ethyl Acetate)

About 0.1 g of the pressure-sensitive adhesive layer is sampled from the double-sided pressure-sensitive adhesive sheet, wrapped with a porous tetrafluoroethylene sheet (trade name "NTF1122", manufactured by Nitto Denko Corporation) having an average pore size of 0.2 μm, and it is tied up with a kite string and at this time.

Subsequently, the pressure-sensitive adhesive layer of the present invention wrapped with a tetrafluoroethylene sheet and tied up with a kite string is put in a 50 ml-volume vessel filled with ethyl acetate, followed by allowing to stand still at 23° C. for 7 days. The ethyl acetate solution (including the sol matter extracted) is then taken out of the vessel, and it is dried under reduced pressure to volatilize the solvent (ethyl acetate), and the sol matter is obtained.

The weight average molecular weight of the sol matter is measured by a gel permeation chromatograph (GPC) method after dissolving the sol matter in tetrahydrofurane (THF).

The weight average molecular weight of the sol matter can be controlled by the weight average molecular weight of the acrylic polymer, and the kind and amount of the cross-linking agent used (added).

The molecular weight distribution (Mw/Mn) of the sol matter is not particularly limited, but is preferably 5.0 or less, and more preferably 4.0 or less. By setting the molecular weight distribution to 5.0 or less, a low molecular weight component existing in the pressure-sensitive adhesive layer is decreased, and thus, the durability is improved.

The molecular weight distribution of the sol matter can be controlled by the kind or amount of a polymerization initiator used, the polymerization temperature and the amount of a chain-transfer agent.

The weight average molecular weight and molecular weight distribution of the sol matter can be measured by a gel permeation chromatography (GPC) method. In detail, for example, the weight average molecular weight and molecular weight distribution of the sol matter can be measured by the same method as in the method for measuring the weight average molecular weight and molecular weight distribution of acrylic polymer to be described below.

The haze of the pressure-sensitive adhesive layer of the present invention (in accordance with JIS K7136) is not particularly limited, but is preferably 1.5% or less, and more preferably 1.0% or less. By setting the haze to 1.5% or less, transparency is improved and transparency or an appearance of the laminated optical product or optical member is not negatively affected. The haze can be measured by using a haze meter (manufactured by Murakami Color Research Laboratory, trade name "HM-150") by laminating the pressure-sensitive adhesive layer of the present invention to, for example, a slide glass (for example, total light transmittance of 91.8% and haze of 0.4%).

The total light transmittance of the pressure-sensitive adhesive layer of the present invention in a visible light wavelength region (in accordance with JIS K7361) is not particularly limited, but is preferably 90% or more, and more preferably 91% or more. By setting the total light transmittance to 90% or more, transparency is improved, and transparency or an appearance of the optical product or optical member is not negatively affected. The total light transmittance can be measured by using a haze meter (manufactured by Murakami Color Research Laboratory, trade name "HM-150") by laminating the pressure-sensitive adhesive layer of the present invention to, for example, a slide glass (for example, total light transmittance of 91.8% and haze of 0.4%).

The thickness of the pressure-sensitive adhesive layer of the present invention is not particularly limited, but is preferably 10 to 500 µm, more preferably 10 to 250 µm, and particularly preferably 10 to 200 µm. By setting the thickness to 10 µm or more, it is likely to distribute stress generated when laminating. Therefore, release hardly occurs, and thus, the durability is improved. The step absorbability is also improved. On the other hand, by setting the thickness to 500 µm or less, crimps are hardly formed when winding after coating.

The pressure-sensitive adhesive layer of the present invention is not particularly limited as long as the moisture ratio after storage under the environment of 60° C. and 95% RH for 120 hours and shear storage elastic modulus (85° C.) are in the above range. The kind of a pressure-sensitive adhesive for forming the pressure-sensitive adhesive layer of the present invention is not particularly limited, but for example, examples thereof include a known pressure-sensitive adhesive such as an acrylic pressure-sensitive adhesive, a rubber-based pressure-sensitive adhesive, a vinylalkylether-based pressure-sensitive adhesive, a silicon-based pressure-sensitive adhesive, a polyester-based pressure-sensitive adhesive, a polyamide-based pressure-sensitive adhesive, a urethane-based pressure-sensitive adhesive, a fluorine-based pressure-sensitive adhesive, and an epoxy-based pressure-sensitive adhesive. These pressure-sensitive adhesive may be used either alone or in combination of two or more thereof. These pressure-sensitive adhesive may be an pressure-sensitive adhesive in any shape, and examples thereof include an emulsion type pressure-sensitive adhesive, a solvent type (solution type) pressure-sensitive adhesive, an active energy-ray curable pressure-sensitive adhesive, and a hot melt type pressure-sensitive adhesive.

Among the pressure-sensitive adhesive for forming the pressure-sensitive adhesive layer of the present invention, the acrylic pressure-sensitive adhesive is preferred from the viewpoint of weather resistance and cost. That is, the pressure-sensitive adhesive layer of the present invention is preferably an acrylic pressure-sensitive adhesive layer that includes the acrylic polymer as a main component. The amount of the acrylic polymer in the pressure-sensitive adhesive layer of the present invention is preferably 65 wt % or more (for example, 65 to 100 wt %), and more preferably 70 to 99.999 wt % based on the pressure-sensitive adhesive layer (100 wt %) of the present invention.

The pressure-sensitive adhesive layer of the present invention (acrylic pressure-sensitive adhesive layer) varies depending on a method for forming the pressure-sensitive adhesive layer, and is not particularly limited. However, the pressure-sensitive adhesive layer is formed from an acrylic pressure-sensitive adhesive composition that includes the acrylic polymer as an essential component, or an acrylic pressure-sensitive adhesive composition that includes, as an essential component, a mixture of monomers constituting the acrylic polymer (referred to as a "monomer mixture" in some cases) or partially polymerized product thereof. Without limitation thereto, as the former acrylic pressure-sensitive adhesive, examples thereof include a so-called solvent type pressure-sensitive adhesive composition, and as the latter acrylic pressure-sensitive adhesive, examples thereof include an active energy-ray curable pressure-sensitive adhesive composition. The above pressure-sensitive adhesive composition may include a crosslinking agent or other various additives, if necessary.

The "pressure-sensitive adhesive composition" includes the meaning of the "composition for forming the pressure-sensitive adhesive layer". The "monomer mixture" means a mixture consisting of monomer components constituting the acrylic polymer. The "partially polymerized product" means a composition in which one or two or more components of the components of the monomer mixture are partially polymerized.

The acrylic polymer is a polymer that is formed from the acrylic monomer as an essential monomer component. For example, the acrylic polymer is preferably, but not particularly limited to, a polymer including, as a monomer component, alkyl ester (meth)acrylate having a linear or branched alkyl group and/or alkoxyalkyl ester (meth)acrylate having a linear or branched alkyl group and a polar group-containing monomer. The monomer component constituting the acrylic polymer may include other copolymerizable monomer(s). The "(meth)acryl" means "acryl" and/or "methacryl" (any one or both of "acryl" and "methacryl"), and the same applies to the following.

The alkyl ester (meth)acrylate having the linear or branched alkyl group (hereinafter, simply referred to as "alkyl ester (meth)acrylate in some cases) may include, for example, alkyl ester (meth)acrylate having 1 to 20 carbon atoms such as methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, t-butyl (meth)acrylate, pentyl (meth)acrylate, isopentyl (meth)acrylate, hexyl (meth)acrylate, heptyl (meth)acrylate, octyl (meth)acrylate, 2-ethylhexyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, dodecyl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, nonadecyl (meth)acrylate and eicosyl (meth)acrylate. The alkyl ester (meth)acrylate may be used alone or in combination of two or more thereof. Among them, as the alkylester (meth)acrylate, methyl methacrylate (MMA), butyl acrylate (BA) and 2-ethylhexyl acrylate (2EHA) are preferable.

The alkoxyalkyl ester (meth)acrylate (alkoxyalkyl (meth)acrylate) may include, but not particularly limited to, for example, 2-methoxyethyl (meth)acrylate, 2-ethoxyethyl (meth)acrylate, methoxytriethylene glycol (meth)acrylate, 3-methoxypropyl (meth)acrylate, 3-ethoxypropyl (meth)acrylate, 4-methoxybutyl (meth)acrylate and 4-ethoxybutyl (meth)acrylate. The alkoxyalkyl ester (meth)arylate may be used alone or in combination of two or more thereof. Among them, 2-methoxyethylacrylate (2MEA) is preferable.

From the viewpoint of low temperature adhesion property, the content of alkyl ester (meth)acrylate and/or alkoxyalkyl ester (meth)acrylate is preferably 30 wt % or more (for example, 30 to 99 wt %), more preferably 50 to 99 wt %, and more preferably 50 to 95 wt % based on the total amount (100 wt %) of monomer components constituting the acrylic polymer. In the case where both alkyl ester (meth)acrylate and alkoxyalkyl ester (meth)acrylate are used as the monomer component of the acrylic polymer, the total amount (total content) of the content of alkylester(meth)acrylate and the content of alkoxyalkylester(meth)acrylate may be within the above range.

In the case where both alkyl ester (meth)acrylate and alkoxyalkyl ester (meth)acrylate are used as the monomer component constituting the acrylic polymer, the content of alkoxyalkyl ester (meth)acrylate is not particularly limited, but is preferably 1 to 75 wt % and more preferably 1 to 50 wt % based on the total content thereof (100 wt %).

The polar group-containing monomer may include, for example, a hydroxyl group-containing monomer such as 2-hydroxyethyl (meth)acrylate, 2-hydroxypropyl (meth)acrylate, 4-hydroxybutyl (meth)acrylate, 6-hydroxyhexyl (meth)acrylate, vinyl alcohol and allyl alcohol; an amide group-containing monomer such as (meth)acrylamide, N,N-dimethyl (meth)acrylamide, N-methylol (meth)acrylamide, N-methoxymethyl (meth)acrylamide, N-butoxymethyl (meth)acrylamide, and N-hydroxyethyl (meth)acrylamide; an amino group-containing monomer such as aminoethyl (meth)acrylate, dimethylaminoethyl (meth)acrylate and t-butylaminoethyl (meth)acrylate; an epoxy group-containing monomer such as glycidyl (meth)acrylate and methyl glycidyl (meth)acrylate; a cyano group-containing monomer such as acrylonitrile and methacrylonitrile; a hetero ring-containing vinyl monomer such as N-vinyl-2-pyrrolidone, (meth)acryloylmorpholine, N-vinylpiperidone, N-vinylpiperazine, N-vinylpyrrole and Nvinylimidazole; a sulfonate group-containing monomer such as sodium vinylsulfonate; a phosphate group-containing monomer such as 2-hydroxyethylacryloyl phosphate; an imide group-containing monomer such as cyclohexylmaleimide and isopropylmaleimide; and an isocyanate group-containing monomer such as 2-methacryloyloxyethyl isocyanate. The polar group-containing monomer may be used alone or in combination of two or more thereof. Among them, the hydroxyl group-containing monomer and the hetero ring-containing vinyl monomer are preferable.

The content of the polar group-containing monomer is not particularly limited, but is preferably 10 to 25 wt %, and more preferably 10 to 20 wt % based on the total amount (100 wt %) of the monomer components constituting the acrylic polymer.

As the other copolymerizable monomer, a polyfunctional monomer may be used. As the polyfunctional monomer, examples thereof include hexanediol di(meth)acrylate, butanediol di(meth)acrylate, (poly)ethylene glycol di(meth)acrylate, (poly)propylene glycol di(meth)acrylate, neopentyl glycol di(meth)acrylate, pentaerythritol di(meth)acrylate, pentaerythritol tri(meth)acrylate, dipentaerythritol hexa(meth)acrylate, trimethylolpropane tri(meth)acrylate, tetramethylolmethane tri(meth)acrylate, allyl (meth)acrylate, vinyl (meth)acrylate, divinylbenzene, epoxyacrylate, polyester acrylate and urethane acrylate. The polyfunctional monomer may be used alone or in combination of two or more thereof. Among them, dipentaerythritol hexaacrylate may be preferably used from the viewpoint of improvement of durability.

The content of the polyfunctional monomer is preferably 0.5 wt % or less (for example, 0 to 0.5 wt %) and more preferably 0 to 0.1 wt % based on the total amount (100 wt %) of the monomer components constituting the acrylic polymer. By setting the content to 0.5 wt % or less, the release at an end part is suppressed. When the crosslinking agent is used, the polyfunctional monomer may not be used. However, when the crosslinking agent is not used, the content of the polyfunctional monomer is preferably 0.001 to 0.5 wt % and more preferably 0.002 to 0.1 wt %.

As the other copolymerizable monomer other than the polyfunctional monomer, examples thereof include (meth)acrylate other than the above described alkylester (meth)acrylate, alkoxyalkylester (meth)acrylate, polar group-containing monomer, and functional monomer, such as (meth)acrylate having an alicyclic hydrocarbon group such as cyclopentyl (meth)acrylate, cyclohexyl (meth)acrylate and isobornyl (meth)acrylate, and (meth)acrylate having an aromatic hydrocarbon group such as phenyl(meth)acrylate, phenoxyethyl(meth)acrylate and benzyl(meth)acrylate; vinyl esters such as vinyl acetate and vinyl propionate; aromatic vinyl compounds such as styrene and vinyl toluene; olefins or dienes such as ethylene, butadiene, isoprene and isobutylene; vinyl ethers such as vinylalkyl ether; and vinyl chloride.

Among them, the acrylic polymer in the pressure-sensitive adhesive layer of the present invention is preferably an acrylic polymer including, as an essential monomer component, methyl methacrylate. By using methyl methacrylate as the essential monomer component, in particular, the adhesion property to the adherend made of polycarbonate or acrylic is improved, and the shear storage elastic modulus (85° C.) of the pressure-sensitive adhesive layer is also improved, and thus, excellent durability can be exhibited.

The content of methyl methacrylate is preferably 5 to 20 wt %, and more preferably 7 to 18 wt %, and more preferably 10 to 18 wt % based on the total amount (100 wt %) of the monomer components constituting the acrylic polymer. By setting the content to 5 wt % or more, the adhesion property is improved, and the shear storage elastic modulus at 85° C. is improved, and thus, excellent durability can be exhibited. By setting the content to 20 wt % or less, the pressure-sensitive adhesive layer is prevented from excessively hardening, and the step absorbability becomes good.

The acrylic polymer is preferably an acrylic polymer including, as the monomer component, the hydroxyl group-containing monomer. By using the hydroxyl group-containing monomer, since the moisture ratio of the pressure-sensitive adhesive layer is improved, white turbidity due to humidification is easily suppressed. The hydroxyl group-containing monomer is not particularly limited, but hydroxyl group-containing (meth)acrylate is preferable, and 2-hydroxyethyl acrylate (HEA), 4-hydroxybutyl acrylate (4HBA) and 2-hydroxypropyl acrylate are more preferable.

The content of the hydroxyl group-containing monomer (in particular, hydroxyl group-containing (meth)acrylate) is not particularly limited, but for example, is preferably 10 to 25 wt %, more preferably 10 to 22 wt %, and more preferably 12 to 22 wt % based on the total amount (100 wt %) of the monomer components constituting the acrylic polymer. By setting the content to 10 wt % or more, the moisture ratio of the pressure-sensitive adhesive layer is increased, and white turbidity is suppressed. On the other hand, by setting the content to 25 wt % or less, the moisture ratio under high humidity is prevented from excessively increasing, and it is possible to prevent a change in dielectricity from being excessively increased in a normal state and at high humidity. In the case where the change in dielectricity is excessively increased in a normal state and at high humidity, for example, a touch panel may easily have operation failure.

The acrylic polymer preferably includes, as the monomer component, the hetero ring-containing vinyl monomer. By using the hetero ring-containing vinyl monomer, since the moisture ratio and cohesion force of the pressure-sensitive adhesive layer are improved, it is possible to obtain the pressure-sensitive adhesive layer in which white turbidity due to humidification is suppressed and durability is improved. The hetero ring-containing vinyl monomer is not particularly limited, but from the standpoint of cohesion force, N-vinyl cyclic amide is preferable. As the N-vinyl cyclic amide, examples thereof include N-vinyl-2-pyrrolidone, N-vinyl-2-piperidone, and N-vinyl-2-caprolactam. Among them, N-vinyl-2-pyrrolidone (NVP) is preferable.

The content of the hetero ring-containing vinyl monomer (in particular, N-vinyl cyclic amide) is not particularly limited, but for example, is preferably 5 to 20 wt %, more preferably 5 to 15 wt %, and more preferably 7 to 15 wt % based on the total amount (100 wt %) of the monomer components constituting the acrylic polymer. By setting the content to 5 wt % or more, since cohesion force is improved, durability is improved. The moisture ratio of the pressure-sensitive adhesive layer is also increased, and white turbidity is suppressed. By setting the content to 20 wt % or less, the pressure-sensitive adhesive layer is prevented from excessively hardening, and the step absorbability becomes good.

In the pressure-sensitive adhesive sheet of the present invention, the content of the carboxylic group-containing monomer as the monomer component for forming the acrylic polymer is preferably low in order to exhibit corrosion resistance to metal such as a metal thin film or a metal oxide thin film. Specifically, for example, the content of the carboxylic group-containing monomer is preferably less than 5 wt %, more preferably 2 wt % or less (for example, 0 to 2 wt %), and more preferably 0.5 wt % or less (for example, 0 to 0.5 wt %) based on the total amount (100 wt %) of the monomer components constituting the acrylic polymer. By setting the content to less than 5 wt %, corrosion resistance to the metal thin film or metal oxide thin film is improved. As the carboxylic group-containing monomer, examples thereof include (meth)acrylic acid, itaconic acid, maleic acid, fumaric acid, crotonic acid and isocrotonic acid. Further, acid anhydride of the carboxylic group-containing monomer (for example, the acid anhydride-containing monomer such as maleic anhydride and itaconic anhydride) is included as the carboxylic group-containing monomer.

The acrylic polymer can be prepared by polymerizing the monomer components using a known/general polymerization method. As the polymerization method of the acrylic polymer, examples thereof include a solution polymerization method, an emulsion polymerization method, a bulk polymerization method and a polymerization method by an active energy-ray irradiation (active energy-ray polymerization method). However, the solution polymerization method and the active energy-ray polymerization method are preferable from the standpoint of transparency, water resistance and cost.

The active energy-ray irradiated in the active energy-ray polymerization (photopolymerization) may be, for example, an alpha ray, a beta ray, a gamma ray, a neutron ray, and an ionizing radiation such as an electron ray or UV. In particular, UV is preferable. An irradiation energy, an irradiation time and an irradiation method of the active energy-ray are not particularly limited so long as the monomer components may be reacted by activating a photopolymerization initiator.

In the solution polymerization, various kinds of general solvents can be used. Examples of such a solvent include organic solvents such as: esters such as ethyl acetate and n-butyl acetate; aromatic hydrocarbons such as toluene and benzene; aliphatic hydrocarbons such as n-hexane and n-heptane; alicyclic hydrocarbons such as cyclohexane and methylcyclohexane; and ketones such as methylethylketone and methylisobutylketone. The solvents may be used either alone or in combination of two or more thereof.

When the acrylic polymer is prepared, a polymerization initiator such as a photopolymerization initiator (photoinitiator) or a thermal polymerization initiator may be used depending on the kind of polymerization reaction. The polymerization initiator may be used alone or in combination of two or more thereof.

The photopolymerization initiator may include, but not particularly limited to, for example, a benzoin ether photopolymerization initiator, an acetophenon photopolymerization initiator, an α-ketol photopolymerization initiator, an aromatic sulfonyl chloride photopolymerization initiator, a photoactive oxime photopolymerization initiator, a benzoin photopolymerization initiator, a benzyl photopolymerization initiator, a benzophenon photopolymerization initiator, a ketal photopolymerization initiator and a thioxantone photopolymerization initiator. The content of the photopolymerization initiator used is not particularly limited, but for example, is preferably 0.01 to 0.2 parts by weight, and more preferably 0.05 to 0.15 parts by weight based on 100 parts by weight of the total amount of the monomer components constituting the acrylic polymer.

As the benzoin ether photopolymerization initiator, examples thereof include benzoin methyl ether, benzoin ethyl ether, benzoin propyl ether, benzoin isopropyl ether, benzoin isobutyl ether, 2,2-dimethoxy-1,2-diphenylethane-1-on and anisole methyl ether. As the acetophenon photopolymerization initiator, examples thereof include 2,2-diethoxyacetophenon, 2,2-dimethoxy-2-phenylacetophenon, 1-hydroxycyclohexylphenylketone, 4-phenoxydichloroacetophenon and 4-(t-butyl)dichloroacetophenon. As the α-ketol photopolymerization initiator, examples thereof include 2-methyl-2-hydroxypropiophenon and 1-[4-(2-hydroxyethyl)phenyl]-2-methylpropane-1-on. As the aromatic sulfonyl chloride photopolymerization initiator, examples thereof include 2-naphthalenesulfonyl chloride. As the photoactive oxime photopolymerization initiator, examples thereof include 1-phenyl-1,1-propanedion-2-(o-ethoxycarbonyl)-oxime. As the benzoine photopolymerization initiator, examples thereof include benzoin. As the benzyl photopolymerization initiator, examples thereof include benzyl. As the benzophenon photopolymerization initiator, examples thereof include benzophenon, benzoylbenzoate, 3,3'-dimethyl-4-methoxybenzophenon, polyvinylbenzophenon and α-hydroxycyclohexyl phenyl ketone. As the ketal photopolymerization initiator, examples thereof include benzyl dimethyl ketal. As the thioxantone photopolymerization initiator, examples thereof include thioxantone, 2-chlorothioxantone, 2-methylthioxantone, 2,4-dimethylthioxantone, isopropylthioxantone, 2,4-diisopropylthioxantone and dodecylthioxantone.

The polymerization initiator used when the acrylic polymer is prepared by the solution polymerization, may be, for example, an azo initiator, a peroxide polymerization initiator (for example, dibenzoyl peroxide and tert-butyl permaleate) and a redox polymerization initiator. Among the initiators, the azo initiator disclosed in JP 2002-69411 A is particularly preferable. The azo initiator is preferable, since the decomposed product of the initiator hardly remains in the acrylic polymer as a part which causes a gas generated by heat (outgas). As the azo initiator, examples thereof include 2,2'-azobisisobutyronitrile (hereinafter, referred to as AIBN in some cases), 2,2'-azobis-2-methylbutyronitrile (hereinafter, referred to as AMBN in some cases), dimethyl 2,2'-azobis(2-methylpropionate) and 4,4'-azobis-4-cyanovaleric acid. The content of the azo initiator used is preferably 0.05 to 0.5 parts by weight, and more preferably 0.1 to 0.3 parts by weight based on 100 parts by weight of the total amount of the monomer components constituting the acrylic polymer.

The weight average molecular weight (Mw) of the acrylic polymer is not particularly limited, but for example, is preferably 400,000 to 2,000,000, and more preferably 500,000 to 1,500,000. By setting the weight average molecular weight to 400,000 or more, the durability is improved. On the other hand, by setting the weight average molecular weight to 2,000,000 or less, the viscosity of the pressure-sensitive adhesive composition is prevented from excessively increasing, and a coating property is improved.

The weight average molecular weight of the acrylic polymer can be controlled by a kind or amount of the polymerization initiator used, a temperature or time during polymerization, a monomer concentration, monomer dropping rate or the like.

The molecular weight distribution (Mw/Mn) of the acrylic polymer is not particularly limited, but for example, is preferably 15 or less, and more preferably 12 or less. By setting the molecular weight distribution to 15 or less, the durability is improved.

The molecular weight distribution (Mw/Mn) of the acrylic polymer can be controlled by a kind or amount of the polymerization initiator used, a polymerization temperature or the like.

In the present invention, the weight average molecular weight (Mw) and molecular weight distribution (Mw/Mn) of the acrylic polymer can be measured by a gel permeation chromatography (GPC) method. Specifically, for example, the measurement can be performed by using the following measuring apparatus and with a polystyrene conversion value under the following measuring condition.

(Preparing of Measurement Sample)

An acrylic polymer is dissolved in 10 mM-LiBr+10 mM-phosphoric acid/DMF solution (eluent) to prepare a solution in which the concentration of acrylic polymer is 2.0 g/L, followed by leaving the solution overnight. The solution is filtered by a membrane filter of 0.45 μm, and then the filtrate is used as a measurement sample.

(Measuring Apparatus and Condition)

Measuring apparatus: trade name "HLC-8120 GPC" (manufactured by Tosoh Corporation)

Column: trade name "TSK gel, Super AWM-H+ super AW 4000+super AW 2500" (manufactured by Tosoh Corporation)

Column size: each 6.0 mm I.D.×150 mm

Eluent: 10 mM-LiBr+10 mM-phosphate/DMF

Flow rate: 0.4 mL/min

Detector: Refractive Index (RI) detector

Column temperature (measuring temperature): 40° C.

Injection amount: 20 μL

The glass transition temperature (Tg) of the acrylic polymer is not particularly limited, but for example, is preferably −40 to 10° C., and more preferably −30 to 0° C. from the standpoint of the durability. By setting the glass transition temperature to −40° C. or more, the durability is improved. On the other hand, by setting the glass transition temperature to 10° C. or less, the step absorbability and a falling impact property at a low temperature can be improved.

The glass transition temperature (Tg) of the acrylic polymer is a glass transition temperature (theoretical value) represented by the following equation.

$$1/Tg = W_1/Tg_1 + W_2/Tg_2 + \ldots + W_n/Tg_n$$

In the above equation, Tg represents a glass transition temperature (unit: K) of the acrylic polymer, $Tg_i$ represents a glass transition temperature (unit: K) when a monomer i forms a homopolymer, and $W_i$ represents a weight fraction of the monomer i (i=1, 2, . . . , n) in the entire monomer components. The equation is used when the acrylic polymer is configured by n kinds of monomer components such as monomer 1, monomer 2, . . . , monomer n.

The glass transition temperature of the acrylic polymer can be controlled by the kind or content of the monomer constituting the acrylic polymer.

In the pressure-sensitive adhesive composition (acrylic pressure-sensitive adhesive composition) for forming the pressure-sensitive adhesive layer of the present invention, if necessary, known additives such as a crosslinking agent, a crosslinking accelerator, a silane coupling agent, a tackifying resin (rosin derivative, polyterphen resin, petroleum resin, and oil-soluble phenol), an antiaging agent, a filler, a colorant (dye or pigment), a UV absorbing agent, an antioxidant, a chain-transfer agent, a plasticizer, a softener, a surfactant and an antistatic agent may be used as long as the property of the present invention is impaired. When the pressure-sensitive adhesive layer of the present invention is formed, various general solvents may be used. The kind of the solvent is not particularly limited, and examples thereof include any solvents used in the solution polymerization method as described above.

By using the crosslinking agent, the acrylic polymer in the pressure-sensitive adhesive layer of the present invention can be crosslinked and the gel fraction of the pressure-sensitive adhesive layer can be controlled. As the crosslinking agent, examples thereof included an isocyanate-based crosslinking agent, an epoxy-based crosslinking agent, a melamine-based crosslinking agent, a peroxide-based crosslinking agent, a urea-based crosslinking agent, a metal alkoxide-based crosslinking agent, a metal chelate-based crosslinking agent, a metal salt-based crosslinking agent, a carbodiimide-based crosslinking agent, an oxazoline-based crosslinking agent, an aziridine-based crosslinking agent and an amine-based crosslinking agent. The crosslinking agent may be used alone or in combination of two or more thereof. Among the above crosslinking agents, from the standpoint of improvement of the durability, the isocyanate-based crosslinking agent, and the epoxy-based crosslinking agent are preferable, and the isocyanate-based crosslinking agent is more preferable.

As the isocyanate-based crosslinking agent (polyfunctional isocyanate compound), examples thereof include lower aliphatic polyisocyanates such as 1,2-ethylene diisocyanate, 1,4-butylenediisocyanate and 1,6-hexamethylene diisocyanate; alicyclic polyisocyanates such as cyclopentylene diisocyanate, cyclohexylene diisocyanate, isophorone diisocyanate, hydrogenated tolylene diisocyanate and hydrogenated xylene diisocyanate; and aromatic polyisocyanates such as 2,4-tolylene diisocyanate, 2,6-tolylene diisocyanate, 4,4'-diphenylmethane diisocyanate and xylylene diisocyanate. The isocyanate-based crosslinking agent may be, for example, commercially available products such as a trimethylolpropane/tolylene diisocyanate adduct (manufactured by Nippon Polyurethane Industry Co., Ltd., trade name "CORONATE L"), a trimethylolpropane/hexamethylene diisocyanate adduct (manufactured by Nippon Polyurethane Industry Co., Ltd., trade name "CORONATE HL"), a trimethylolpropane/xylylene diisocyanate adduct (manufactured by Mitsui Chemicals Co., Ltd., trade name "TAKENATE 110N").

As the epoxy-based crosslinking agent (polyfunctional epoxy compound), examples thereof include N,N,N',N'-tetraglycidyl-m-xylenediamine, diglycidyl aniline, 1,3-bis (N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic diglycidyl ester, triglycidyl-tris(2-hydroxyethyl)isocyanurate, resorcin diglycidyl ether, bisphenol-5-diglycidyl ether and an epoxy-based resin having two or more epoxy groups in the molecule. The epoxy-based crosslinking agent may be, for example, commercially available products such as trade name "TETRAD C" manufactured by Mitsubishi Gas Chemical Company, Inc.

The content of the crosslinking agent in the pressure-sensitive adhesive composition is not particularly limited, but for example, is preferably 0.001 to 10 parts by weight, and more preferably 0.01 to 5 parts by weight based on the total amount (100 parts by weight) of the monomer components constituting the acrylic polymer. By setting the content to 0.001 parts by weight or more, the durability is improved. On the other hand, by setting the content to 10 parts by weight or less, the step absorbability is improved.

An amine compound containing a plurality of hydroxyl groups as a crosslinking accelerator (crosslinking coagent) may be used in the pressure-sensitive adhesive composition for the purpose of accelerating the crosslinking reaction. The amine compound containing a plurality of hydroxyl groups is not particularly limited so long as the compound is an amine compound having at least two hydroxyl groups (alcoholic hydroxyl group) in the molecule, but for example, the amine compound containing a plurality of hydroxyl groups disclosed in JP 2009-079203 A may be preferably used. If the amine compound containing a plurality of hydroxyl groups is used, crosslinking speed is accelerated, so that productivity is improved. The amine compound may be commercially available products such as trade names of "EDP-300", "EDP-450", "EDP-1100", and "Pluronic" (manufactured by ADEKA Corp.).

The content of the amine compound containing the plurality of hydroxyl groups in the pressure-sensitive adhesive composition is preferably 0.01 to 5.0 parts by weight, and more preferably 0.05 to 1.0 part by weight based on the total amount (100 parts by weight) of the monomer components constituting the acrylic polymer, in order to decrease the aging time by accelerating the crosslinking speed and improve productivity.

The pressure-sensitive adhesive composition may include a silane coupling agent for the purpose of improving an adhesion property to glass (in particular, adhesion reliability to glass at high temperature and high humidity environment). The silane coupling agent is not particularly limited, but γ-glycidoxypropyltrimethoxysilane, γ-glycidoxypropyltriethoxysilane, γ-aminopropyltrimethoxysilane and N-phenyl-aminopropyltrimethoxysilane are preferably exemplified. Among them, γ-glycidoxypropyltrimethoxysilane is preferable. The silane coupling agent may be used alone or in combination of two or more thereof. As the silane coupling agent, for example, a commercially available product such as trade name "KBM-403" (manufactured by Shin-Etsu Chemical Co., Ltd.) may be used.

The content of the silane coupling agent in the pressure-sensitive adhesive composition is preferably 0.01 to 1 part by weight, and more preferably 0.03 to 0.5 parts by weight based on the total amount (100 parts by weight) of the monomer components constituting the acrylic polymer, from the standpoint of improvement of adhesion reliability to glass.

As the method for forming the pressure-sensitive adhesive layer of the present invention, a known and general method for forming the pressure-sensitive adhesive layer may be used and it is not particularly limited, but for example, the following methods (1) to (3) may be used. (1) The pressure-sensitive adhesive layer is formed by coating a pressure-sensitive adhesive composition including a monomer mixture or partially polymerized product and, if necessary, an additive such as a photopolymerization initiator or a crosslinking agent, on a substrate or a separator, and irradiating active energy-ray (in particular, UV is preferable) thereto. (2) The pressure-sensitive adhesive layer is formed by coating a pressure-sensitive adhesive composition (solution) including an acrylic polymer, a solvent, if necessary, an additive such as a crosslinking agent, on a substrate or a separator, and drying and/or curing the composition. (3) The pressure-sensitive adhesive layer formed in (1) is further dried.

In the method for forming the pressure-sensitive layer of the present invention, coating may be performed by a known coating method and using a general coater, for example, a gravure roll coater, a reverse roll coater, a kiss roll coater, a dip roll coater, a bar coater, a knife coater, a spray coater, a comma coater and a direct coater.

A particular preferable specific constitution of the pressure-sensitive adhesive layer of the present invention may be, for example, the pressure-sensitive adhesive layer described in the following (1) or (2). However, the constitution is not limited thereto.

(1) A pressure-sensitive adhesive layer that is formed from a pressure-sensitive composition including 100 parts by weight of acrylic polymer including, as the monomer components, 5 to 20 wt % of methyl methacrylate, 35 to 80 wt % of 2-ethylhexyl acrylate, 5 to 20 wt % of N-vinyl-2-pyrrolidone, and 10 to 25 wt % of 2-hydroxyethyl acrylate based on the total amount (100 wt %) of the monomer components constituting the acrylic polymer, and 0.01 to 5.0 parts by weight of isocyanate-based crosslinking agent.

(2) A pressure-sensitive adhesive layer that is formed from a pressure-sensitive adhesive composition including 100 parts by weight of acrylic polymer including, as the monomer components, 5 to 20 wt % of methyl methacrylate, 35 to 80 wt % of n-butyl acrylate, 5 to 20 wt % of N-vinyl-2-pyrrolidone, and 10 to 25 wt % of 2-hydroxyethyl acrylate based on the total amount (100 wt %) of the monomer components constituting the acrylic polymer, and 0.01 to 5.0 parts by weight of isocyanate-based crosslinking agent.

(Another Pressure-Sensitive Adhesive Layer)

In the case where the pressure-sensitive adhesive sheet of the present invention include the other pressure-sensitive adhesive layer, the other pressure-sensitive adhesive layer may include, but not particularly limited to, for example, a known/general pressure-sensitive adhesive layer that is formed of a known pressure-sensitive adhesive such as a urethane-based pressure-sensitive adhesive, an acrylic pressure-sensitive adhesive, a rubber-based pressure-sensitive adhesive, a silicon-based pressure-sensitive adhesive, a polyester-based pressure-sensitive adhesive, a polyamide-based pressure-sensitive adhesive, an epoxy-based pressure-sensitive adhesive, a vinyl alkyl ether-based pressure-sensitive adhesive, and a fluorine-based pressure-sensitive adhesive. The pressure-sensitive adhesive may be used either alone or in combination of two or more thereof.

(Substrate)

In the case where the pressure-sensitive adhesive sheet of the present invention includes a substrate, the substrate is not particularly limited, but may be various films (for example, the optical film to be described below) such as a plastic film, an antireflection (AR) film, a polarizing plate, and a retardation film. Materials of the plastic film may be, for example, plastic material such as polyester resins such as polyethylene terephthalate (PET); acrylic resins such as polymethyl methacrylate (PMMA); polycarbonate; triacetyl celluous (TAC); polysulfone; polyarylate; polyimide; polyvinyl chloride; polyvinyl acetate; polyethylene; polypropylene; ethylene propylene copolymer; and cyclic olefin polymer such as trade name "ARTON (cyclic olefin polymer; manufactured by JSR)", trade name "ZEONOR (cyclic olefin polymer; manufactured by Nippon Zeon Co., Ltd.)". The plastic materials may be used alone or in combination of two or more thereof. The "substrate" is a part laminated to an adherend together with the pressure-sensitive adhesive layer, when the pressure-sensitive adhesive sheet is used (laminated) to the adherend (such as an optical member). The separator (release liner) released in the use (lamination) of the pressure-sensitive adhesive sheet is not included in the "substrate".

Among them, the substrate is preferably a transparent substrate. The total light transmittance of the substrate in a visible light wavelength region (in accordance with JIS K7361) is not particularly limited, but is preferably 85% or more, and more preferably 88% or more. A haze of the substrate (in accordance with JIS K7136) is not particularly limited, but is preferably 1.5% or less, and more preferably 1.0% or less. The transparent substrate may be a PET film or a non-oriented film such as trade name "ARTON", and trade name "ZEONOA".

The thickness of the substrate is not particularly limited, but for example, is preferably 12 to 75 μm. The substrate may have a single layer or multilayer shape. On the surface of the substrate, for example, a known/general surface treatment such as a physical treatment such as a corona discharge treatment and a plasma treatment and a chemical treatment such as a basecoat treatment, may be properly preformed.

(Pressure-Sensitive Adhesive Sheet of Present Invention)

The pressure-sensitive adhesive sheet of the present invention is not particularly limited as long as it includes the pressure-sensitive adhesive layer of the present invention, and it may be a substrateless type double-sided pressure-sensitive adhesive sheet consisting of the pressure-sensitive adhesive layer of the present invention, and a pressure-sensitive adhesive sheet with a substrate, which includes the pressure-sensitive adhesive layer of the present invention on at least one surface of the substrate.

In the pressure-sensitive adhesive sheet of the present invention, a peeling distance when an adherent is a polyethylene terephthalate plate (PET plate) (referred to as "peeling distance (to PET)" in some cases), which is measured by the following constant-load peel test, is 30 mm or less, preferably 0 to 20 mm, and more preferably 0 to 10 mm. The peeling distance (to PET) is an index showing the strength of the adhesion property of the pressures-sensitive adhesive sheet to the PET-made adherend in the adhesion interface. That is, by setting the peeling distance (to PET) of the pressure-sensitive adhesive sheet to 30 mm or less, the excellent antifoaming release property and high durability can be exhibited especially in the case where the sheet is limited to the PET-made adherend.

The constant-load peel test is as follows.

A surface of the pressure-sensitive adhesive layer of the pressure-sensitive adhesive sheet having a size of 20 mm in width and 60 mm in length is laminated to one surface of the adherend (PET plate), followed by treating in an autoclave under a condition of 50° C. and 5 atm for 15 min, and subsequently, a load of 100 gf in a direction which is vertical to the surface of the PET plate (i.e. in a direction away from the PET plate) is applied to an end of the pressure-sensitive adhesive sheet in a length direction under a condition of 23° C. and 50% RH, and the peeling distance of the pressure-sensitive adhesive sheet after the passage of 3 hours under condition of 23° C. and 50% RH is measured. The peeling distance is defined as "peeling distance (to PET)".

The more detailed test method, for example, is as follows (see FIGS. 1 to 3).

(Constant-Load Peel Test)

The glass plate was laminated to a surface of one side of the polyethylene terephthalate film (PET film, manufactured by Toyobo Co., Ltd., trade name "A4300", length 100 mm×width 30 mm, thickness of 125 μm) by using the double-sided pressure-sensitive adhesive tape to perform reinforcement to prepare a polyethylene terephthalate plate. The surface of the pressure-sensitive adhesive layer of the pressure-sensitive adhesive sheet (width 20 mm×length 60 mm) of the present invention is laminated to one side (surface of the PET film side) of the polyethylene terephthalate plate (PET plate (a lamination of the PET film and the glass plate), length 100 mm×width 30 mm, thickness of 2.0 mm), followed by treating in the autoclave under the condition of 50° C. and 5 atm for 15 min.

Figure 2:
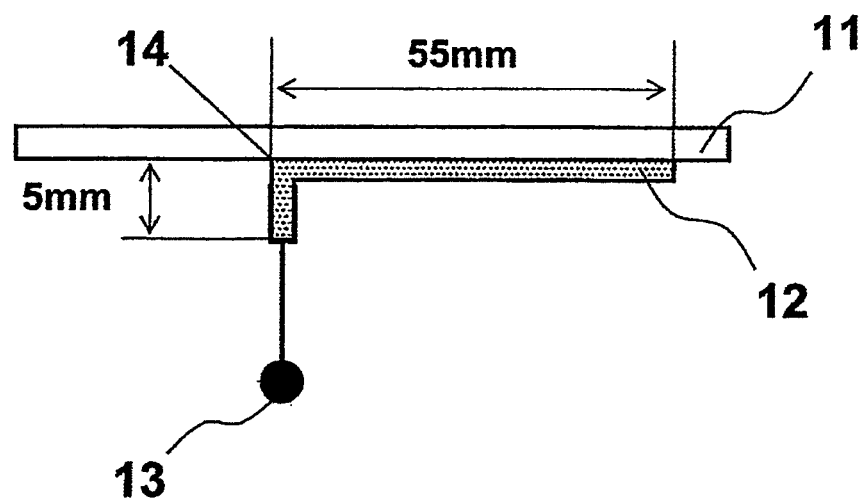
FIG. 2 is a schematic view (side view) showing the positional relationship among a test plate, a pressure-sensitive adhesive sheet and a weight at the start of measurement in a constant-load peel test.

Subsequently, as shown in FIGS. 1 and 2, the PET plate 11 is horizontally placed such that the surface laminated with the pressure-sensitive adhesive sheet 12 the bottom surface. The pressure-sensitive adhesive sheet 12 is peeled 5 mm longitudinally from the terminal end (one terminal end) in the length direction, the weight 13 of 100 g is hung with thread from the end in the length direction (at a widthwise center position), and a load of 100 gf is applied to the end in the length direction of the pressure-sensitive adhesive sheet 12 in the direction perpendicular to the surface of the PET plate 11.

Thereafter, the system is left standing for 3 hours under the condition of 23° C. and 50% RH, and a "peeling distance (to PET)" is obtained by measuring the peeling distance 16 of the pressure-sensitive adhesive sheet 12.

Figure 3:
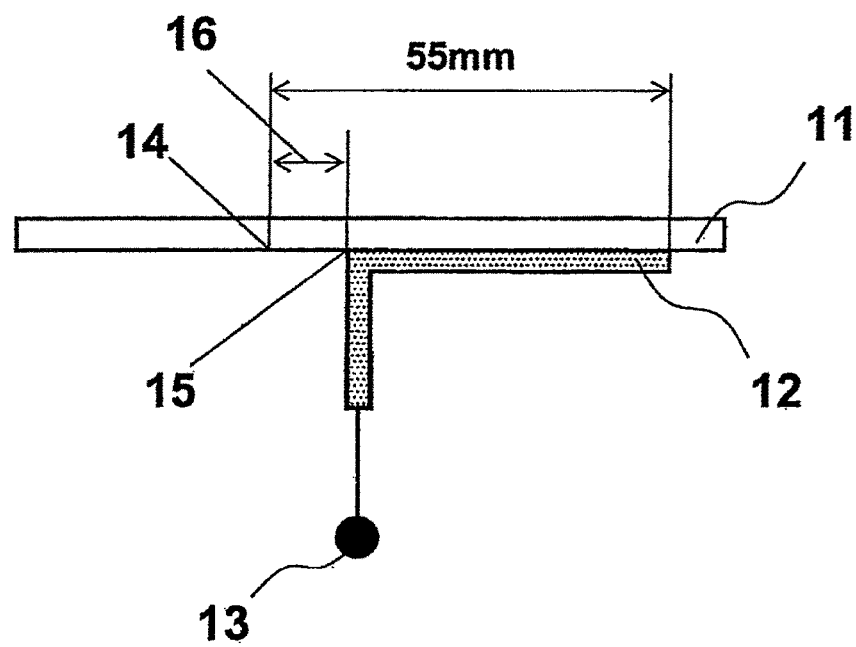
FIG. 3 is a schematic view (side view) showing the peeled state and peeling distance of a pressure-sensitive adhesive sheet after the passage of 3 hours from the start of measurement in a constant-load peel test.

In this connection, the peeling distance is the length (longitudinal distance) of the pressure-sensitive adhesive sheet separated with the passage of 3 hours after the start of measurement and indicates the distance 16 between the end position 14 where the pressure-sensitive adhesive sheet and the PET plate are closely contacted at the start of measurement, and the end position 15 where the pressure-sensitive adhesive sheet and the PET plate are closely contacted after the passage of 3 hours (see, FIGS. 2 and 3).

In the case where the pressure-sensitive adhesive sheet is a double-sided pressure-sensitive adhesive sheet, the measurement may be performed after a PET film having the thickness of 25 μm is laminated (lined) to the pressure-sensitive adhesive surface opposite the PET plate.

In the pressure-sensitive adhesive sheet of the present invention, the peeling distance when the adherend is an acrylic plate (referred to a "peeling distance to acryl" in some cases), which is measured by the constant-load peel test, is 30 mm or less, preferably 0 to 20 mm, and more preferably 0 to 10 mm. The peeling distance (to acryl) is an index showing the strength of the adhesion property of the pressure-sensitive adhesive sheet to the acryl-made or polycarbonate-made adherend in the adhesion interface. Accordingly, by setting the peeling distance (to acryl) to 30 mm or less, the excellent antifoaming release property and high durability can be exhibited especially in the case where the sheet is laminated to the acryl-made or polycarbonate-made adherend. The constant-load peel test can be performed by using the same method as in the above constant-load peel test for measuring the peeling distance (to PET), except that the acrylic plate (PMMA plate, manufactured by Mitsubishi Rayon Co., Ltd., trade name "MR-200") is used instead of the PET plate.

The total amount of the acrylic acid ion and methacrylic acid ion extracted from the pressure-sensitive adhesive sheet of the present invention under the condition of 100° C. and 45 min with pure water (amount of the extracted (meth) acrylic acid ion), which is measured by an ion chromatograph method, is not particularly limited, but is preferably 20 ng/cm$^2$ or less (for example, 0 to 20 ng/cm$^2$), more preferably 0 to 17 ng/cm$^2$, and more preferably 0 to 15 ng/cm$^2$ per unit area of the pressure-sensitive adhesive layer of the present invention. The amount of the extracted (meth)acrylic acid ion shows the degree of easiness of dissociation of the acrylic acid ion and methacrylic acid ion by moisture from the pressure-sensitive adhesive layer in the case where the pressure-sensitive adhesive sheet of the present invention is put under the humidified environment. By setting the amount of extracted (meth)acrylic acid ion to 20 ng/cm$^2$ or less, even though the sheet is stored in the presence of moisture such as the humidified environment in a state where the sheet is laminated to a metal thin film, the metal thin film is hardly corroded and the corrosion resistance is improved.

The "total amount of the acrylic acid ion and methacrylic acid ion extracted from the pressure-sensitive adhesive sheet of the present invention under the condition of 100° C. and 45 min with pure water, which is measured by the ion chromatograph method", can be measured by using the following method.

First, the pressure-sensitive adhesive sheet is cut into an appropriate size, and in the case where the separator is provided, the separator is peeled, and the pressure-sensitive adhesive surface is exposed, which is used as the sample. In the case of the double-sided pressure-sensitive adhesive sheet, only one pressure-sensitive adhesive surface is exposed by laminating the PET film (thickness of 25 to 50 µm) to the other pressure-sensitive adhesive surface. In this case, the pressure-sensitive adhesive surface laminated to the metal thin film (in the case of the pressure-sensitive adhesive sheet of the present invention, the surface of the pressure-sensitive adhesive layer side of the present invention) is exposed. The size of the sample (exposure area of the pressure-sensitive adhesive surface) is preferably 100 cm$^2$.

Subsequently, the sample is put into pure water having a temperature of 100° C., followed by boiling for 45 min, and boiling extraction of the acrylic acid ion and methacrylic acid ion is performed.

Subsequently, the total amount (unit: ng) of the acrylic acid ion and methacrylic acid ion in the obtained extraction solution is measured by using the ion chromatograph method (ion chromatography), and the total amount (unit: ng/cm$^2$) of the acrylic acid ion and methacrylic acid ion per unit area of the pressure-sensitive adhesive surface (exposed pressure-sensitive adhesive surface) of the sample is calculated. The measuring condition of the ion chromatograph method (ion chromatography) is not particularly limited, but for example, may be the following condition.

(Measurement Conditions of Ion Chromatography)
Analysis device: DX-320, manufactured by DIONEX Co., Ltd.
Separation column: Ion Pac AS15 (4 mm×250 mm)
Guard column: Ion Pac AG15 (4 mm×50 mm)
Removal system: ASRS-ULTRA (External mode, 100 mA)
Detector: electric conductivity detector
Eluent: 7 mM KOH (0 to 20 min)
45 mM KOH (20 to 30 min)
(eluent generator EG40 is used)
Flow rate of eluent: 1.0 ml/min
Injection amount of sample: 250 µl The (meth)acrylic acid ion dissociated by moisture from the pressure-sensitive adhesive sheet generally comes from the (meth)acrylic acid existing in the pressure-sensitive adhesive layer. It is assumed that the reason is that the (meth)acrylic acid ion disturbs conduction by penetrating the metal thin film due to moisture under the high temperature and high humidity environment, thereby causing an increase in resistance of the metal thin film (corrosion of the metal thin film). In general, in the case where a large amount (for example, 10 wt % or more) of (meth)acrylic acid (in particular, acrylic acid) is used as the monomer component constituting the acrylic polymer for the purpose of improving the adhesion property of the pressure-sensitive adhesive sheet, unreacted (meth)acrylic acid easily remains in the pressure-sensitive adhesive layer, so that the (meth)acrylic acid ion dissociated by moisture from the pressure-sensitive adhesive sheet is also increased. On the other hand, in the present invention, in the case where the (meth)acrylic acid remaining in the pressure-sensitive adhesive layer is decreased by sufficiently performing drying at the time of forming the pressure-sensitive adhesive layer, increasing the polymerization time of the acrylic polymer, or decreasing the amount of (meth)acrylic acid used as the monomer component, the (meth)acrylic acid ion dissociated by moisture from the pressure-sensitive adhesive sheet is small, so that corrosion of the metal thin film as the adherend or increase in resistance, which are caused thereby, is suppressed.

The haze of the pressure-sensitive adhesive sheet of the present invention (in accordance with JIS K7136) is not particularly limited, but is preferably 3.0% or less, and more preferably 1.5% or less. By setting the haze to 3.0% or less, an appearance or transparency of an optical product or optical member is not negatively affected. The haze can be measured, for example, by using the same method as in the measurement of the haze of the pressure-sensitive adhesive layer.

The total light transmittance of the pressure-sensitive adhesive sheet of the present invention in a visible light wavelength region (in accordance with JIS K7361) is not particularly limited, but is preferably 87% or more, and more preferably 89% or more. By setting the total light transmittance to 87% or more, an appearance or transparency of an optical product or optical member is not negatively affected. The total light transmittance can be measured, for example, by using the same method as in the measurement of the total light transmittance of the pressure-sensitive adhesive layer.

The pressure-sensitive adhesive surface of the pressure-sensitive adhesive sheet of the present invention may be protected by the separator (release liner) until it is used. In the case where the pressure-sensitive adhesive sheet of the present invention is a double-sided pressure-sensitive adhesive sheet, each pressure-sensitive adhesive surface may be protected by using separators, respectively, or protected in such a way that the surface is wound in a roll form by using one separator of which both sides are release surfaces. The separator is used as a protective material of the pressure-sensitive adhesive layer, and peeled when the pressure-sensitive adhesive layer is laminated to the adherend. In the case where the pressure-sensitive adhesive sheet of the present invention is a substrateless pressure-sensitive adhesive sheet, the separator functions as a support of the pressure-sensitive adhesive layer. The separator may not be provided. Any known release paper may be used as a separator. The separator may be, but not particularly limited to, for example, a separator having a release treated layer, a low adhesive substrate composed of a fluorine polymer, or a low adhesive substrate composed of a non-polar polymer. As the separator having the release treated layer, examples thereof include a plastic film or paper whose surface is treated by a release agent such as silicon type, long-chain alkyl type, fluorine type, and molybdenum sulfide. As the fluorine-based polymer in the low adhesive substrate composed of fluorine polymer, examples thereof include polytetrafluoroethylene, polychlorotrifluoroethylene, polyvinyl fluoride, polyvinylidene fluoride, a tetrafluoroethylene-hexafluoropropylene copolymer and a chlorofluoroethylene-vinylidene fluoride copolymer. As the non-polar polymer, examples thereof include an olefine-based resin (for example, polyethylene, polypropylene and the like). The separator can be formed by using a known/general method. The thickness of the separator is not particularly limited.

The pressure-sensitive adhesive sheet of the present invention is an optical pressure-sensitive adhesive sheet used in laminating the optical members or in manufacturing the optical product. If the pressure-sensitive adhesive sheet of the present invention is used for these purposes, an occurrence of bubbles or lift-off and white turbidity, which obscures visibility or appearance of the product, are suppressed, so that it is possible to obtain a product having an excellent appearance.

The pressure-sensitive adhesive sheet of the present invention is preferably used in laminating the optical members used in the optical product. The optical member refers to a member having an optical characteristic (for example, a polarized property, a photorefractive property, a light scattering property, a light reflective property, a light transmitting property, a light absorbing property, a light diffractive property, an optical rotation property and visibility). The optical member is not particularly limited so long as the optical member is the member having the optical characteristic, and examples thereof include a polarizing plate, a wave plate, a retardation plate, an optical compensation film, a brightness enhancing film, a light guide plate, a reflective film, an anti-reflective film, a transparent conductive film (e.g. ITO film), a design film, a decoration film, a surface protective film, a prism, lens, a color filter, a transparent substrate, and a member in which these are laminated (collectively referred to as "an optical film" in some cases). Each of the "plate" and the "film" include a plate shape, a film shape, and a sheet shape, and for example, the "polarizing film" includes a "polarizing plate" and a "polarizing sheet". For example, by laminating the optical film by using the pressure-sensitive adhesive sheet of the present invention, or by laminating the substrateless type pressure-sensitive adhesive sheet of the present invention to at least one surface of the optical film, it is possible to obtain the optical film having the pressure-sensitive adhesive sheet of the present invention.

In particular, in the case where the pressure-sensitive adhesive sheet of the present invention is a double-sided pressure-sensitive adhesive sheet, by attaching the pressure-sensitive adhesive sheet of the present invention to at least one surface of various optical films and laminating them, it is possible to obtain a pressure-sensitive adhesive type optical film including the pressure-sensitive adhesive layer of the present invention on at least one surface of the optical film (optical film including the pressure-sensitive adhesive sheet of the present invention). The pressure-sensitive adhesive sheet of the present invention (double-sided pressure-sensitive adhesive sheet) used in the pressure-sensitive adhesive type optical film may be a substrateless pressure-sensitive adhesive sheet or a pressure-sensitive adhesive sheet with substrate.

A material constituting the optical member is not particularly limited, but for example, may be a plastic material such as an acrylic resin, a polycarbonate resin, and polyethylene terephthalate, glass and metal (including metal oxide).

The pressure-sensitive adhesive sheet of the present invention is not particularly limited, but is preferably used when manufacturing a display device (image display device) such as a liquid crystal display device, an organic EL (electroluminescence) display device, a PDP (plasma display panel), and an electronic paper. The pressure-sensitive adhesive sheet of the present invention may also be used when manufacturing an input device such as a touch panel. For example, it is possible to obtain the display device including the pressure-sensitive adhesive sheet of the present invention by manufacturing the display device by using the optical member (for example, optical film) including the pressure-sensitive adhesive sheet of the present invention, or by manufacturing the display device by using the pressure-sensitive adhesive sheet of the present invention.

In the case where the amount of the extracted (meth) acrylic acid ion is controlled within the predetermined range, the pressure-sensitive adhesive sheet of the present invention can exhibit excellent corrosion resistance and, in particular, is preferably used for the purpose of being laminated to the metal thin film (metal thin film or metal oxide thin film). The metal thin film may be a thin film composed of metal, metal oxide or a mixture thereof, and it is not particularly limited. Examples thereof include a thin film of ITO (indium tin oxide), ZnO, SnO, and CTO (cadmium tin oxide). The thickness of the metal thin film is not particularly limited, but is preferably 100 to 2,000 Å. The metal thin film such as ITO may be provided on, for example, the PET film, and is used as a transparent conductive film. When the pressure-sensitive adhesive sheet of the present invention is laminated to the metal thin film, the surface of the pressure-sensitive adhesive layer of the present invention may be a pressure-sensitive adhesive surface to which the metal thin film is laminated.

As an example of a specific use application of the pressure-sensitive adhesive sheet of the present invention, there may be a pressure-sensitive adhesive sheet for a touch panel used in manufacturing the touch panel. For example, in manufacturing an electrostatic capacity type touch panel, a transparent conductive film on which a metal thin film such as ITO is provided, a polymethylmethacrylate (PMMA) plate, a hard coat film, or a glass lens may be laminated through the pressure-sensitive adhesive sheet of the present invention. The touch panel is not particularly limited, but for example, is used in a cellular phone including the touch panel.

EXAMPLES

Hereinafter, the present invention will be described in detail based on the Examples, but the present invention is not limited to the Examples. The mixing amount of "TAKENATE D110N" (solid content: 75 wt %) in the following description and Table 1 was represented by the mixing amount (parts by weight) in terms of the solid content of "TAKENATE D110N". The mixing amount of "KBM-403" and "EDP-300" was represented by the mixing amount (parts by weight) of each of "KBM-403" and "EDP-300" (mixing amount of the product).

Example 1

63 parts by weight of 2-ethylhexyl acrylate (2EHA), 15 parts by weight of N-vinyl-2-pyrrolidone (NVP), 9 parts by weight of methyl methacrylate (MMA), and 13 parts by weight of 2-hydroxyethyl acrylate (HEA) as the monomer component, 0.2 parts by weight of 2,2'-azobisisobutyronitrile as the polymerization initiator, 133 parts by weight of ethyl acetate as the polymerization solvent were put into the separable flask, followed by stirring for 1 hour while nitrogen gas was introduced. After oxygen in the polymerization system was removed thereby, the system was heated to 65° C., followed by reacting for 10 hours, and thereafter, ethyl acetate was added thereto to obtain the acrylic polymer solution having a solid concentration of 30 wt %.

As shown in Table 1, the pressure-sensitive adhesive composition (solution) was prepared by adding, based on 100 parts by weight of the acrylic polymer in the acrylic polymer solution, 0.3 parts by weight of the isocyanate-based crosslinking agent (trade name "TAKENATE D110N", manufactured by Mitsui Chemicals, Inc.) as the crosslinking agent, 0.2 parts by weight of polyol in which propylene oxide was added to ethylenediamine (trade name "EDP-300", manufactured by Adeca Co., Ltd.) as the crosslinking accelerator, and 0.15 parts by weight of γ-glycidoxypropyltrimethoxysilane (trade name "KBM-403", manufactured by Shin-Etsu Chemical Co., Ltd.) as the silane coupling agent, and mixing them.

Next, the pressure-sensitive adhesive composition was coated on the release-treated surface of the release liner (trade name "MRF 75", manufactured by Mitsubishi Plastics Inc.) so that the thickness after drying was 50 μm, followed by heating and drying under normal pressure at 60° C. for 1 min and at 155° C. for 1 min, and then, aging was further performed at 23° C. for 120 hours to obtain a double-sided pressure-sensitive adhesive sheet (substrateless double-sided pressure-sensitive adhesive sheet).

Example 2

As shown in Table 1, the double-sided pressure-sensitive adhesive sheet (substrateless double-sided pressure-sensitive adhesive sheet) in which the thickness of the pressure-sensitive adhesive layer was 50 μm was obtained in the same manner as in Example 1, except that the use amount of the isocyanate-based crosslinking agent "TAKENATE D110N" was changed to 0.5 parts by weight.

Example 3

As shown in Table 1, the double-sided pressure-sensitive adhesive sheet (substrateless double-sided pressure-sensitive adhesive sheet) in which the thickness of the pressure-sensitive adhesive layer was 50 μm was obtained in the same manner as in Example 1, except that 76 parts by weight of n-butyl acrylate (BA), 6 parts by weight of N-vinyl-2-pyrrolidone, 5 parts by weight of methyl methacrylate, and 13 parts by weight of 2-hydroxyethyl acrylate were used as the monomer component, and the use amount of the isocyanate-based crosslinking agent "TAKENATE D110N" was changed to 0.5 parts by weight.

Example 4

As shown in Table 1, the double-sided pressure-sensitive adhesive sheet (substrateless double-sided pressure-sensitive adhesive sheet) in which the thickness of the pressure-sensitive adhesive layer was 50 μm was obtained in the same manner as in Example 1, except that 72 parts by weight of n-butyl acrylate, 10 parts by weight of N-vinyl-2-pyrrolidone, 5 parts by weight of methyl methacrylate, and 13 parts by weight of 2-hydroxyethyl acrylate were used as the monomer component, and the use amount of the isocyanate-based crosslinking agent "TAKENATE D110N" was changed to 0.5 parts by weight.

Comparative Example 1

As shown in Table 1, the double-sided pressure-sensitive adhesive sheet (substrateless double-sided pressure-sensitive adhesive sheet) in which the thickness of the pressure-sensitive adhesive layer was 50 μm was obtained in the same manner as in Example 1, except that 72 parts by weight of 2-ethylhexyl acrylate, 15 parts by weight of N-vinyl-2-pyrrolidone, and 13 parts by weight of 2-hydroxyethyl acrylate were used as the monomer component, and the use amount of the isocyanate-based crosslinking agent "TAKENATE D110N" was changed to 0.5 parts by weight.

Comparative Example 2

As shown in Table 1, the double-sided pressure-sensitive adhesive sheet (substrateless double-sided pressure-sensitive adhesive sheet) in which the thickness of the pressure-sensitive adhesive layer was 50 μm was obtained in the same manner as in Example 1, except that 72 parts by weight of 2-ethylhexyl acrylate, 15 parts by weight of methyl methacrylate, and 13 parts by weight of 2-hydroxyethyl acrylate were used as the monomer component, and the used amount of the isocyanate-based crosslinking agent "TAKENATE D110N" was changed to 0.5 parts by weight.

Comparative Example 3

As shown in Table 1, the double-sided pressure-sensitive adhesive sheet (substrateless double-sided pressure-sensitive adhesive sheet) in which the thickness of the pressure-sensitive adhesive layer was 50 μm was obtained in the same manner as in Example 1, except that 71 parts by weight of 2-ethylhexyl acrylate, 15 parts by weight of N-vinyl-2-pyrrolidone, 9 parts by weight of methyl methacrylate, and 5 parts by weight of 2-hydroxyethyl acrylate were used as the monomer component, and the use amount of the isocyanate-based crosslinking agent "TAKENATE D110N" was changed to 0.5 parts by weight.

Comparative Example 4

As shown in Table 1, the double-sided pressure-sensitive adhesive sheet (substrateless double-sided pressure-sensitive adhesive sheet) in which the thickness of the pressure-sensitive adhesive layer was 50 μm was obtained in the same manner as in Example 1, except that 77 parts by weight of 2-ethylhexyl acrylate, 3 parts by weight of N-vinyl-2-pyrrolidone, 3 parts by weight of methyl methacrylate, and 13 parts by weight of 2-hydroxyethyl acrylate were used as the monomer component, and the use amount of the isocyanate-based crosslinking agent "TAKENATE D110N" was changed to 0.5 parts by weight.

(Evaluation)

The following measurements and evaluations shown in Table 1 were performed with respect to the pressure-sensitive adhesive sheet (double-sided pressure-sensitive adhesive sheet) obtained in the Examples and the Comparative Examples. The measuring methods and evaluation methods are described below. The gel fraction and the weight average molecular weight (Mw) and molecular weight distribution (Mw/Mn) of the sol matter of the pressure-sensitive adhesive layer of the double-sided pressure-sensitive adhesive sheet obtained in the Examples and the Comparative Examples were measured by using the above-described method.

(1) Moisture Ratio

The double-sided pressure-sensitive adhesive sheet obtained in the Examples and the Comparative Examples was cut into a size of width 1 cm×length 2 cm (area: 2 cm$^2$). Next, the release liner was peeled therefrom, and an aluminum foil was laminated to one pressure-sensitive adhesive surface, while the other pressure-sensitive adhesive surface was in the exposed state, to prepare the sample (having the layer structure of "pressure-sensitive adhesive layer/aluminum foil"). The weight of the aluminum foil laminated to the sample was measured in advance before the foil was laminated to the pressure-sensitive adhesive sheet.

The sample was put in the thermo-hygrostat in which the condition was controlled to 60° C. and 95% RH, followed by storing for 120 hours. Thereafter, the sample was taken from the thermo-hygrostat, and the weight of the sample was measured. Subsequently, the sample was put in the following heating vaporization apparatus, and the gas generated by heating at 150° C. for 10 min was introduced into titration cell of the following coulometric titration moisture measuring apparatus, and then the moisture content (μg) of the gas was measured to measure the moisture content (μg) of the pressure-sensitive adhesive layer after storage under the environment of 60° C. and 95% RH for 120 hours. The moisture ratio (wt %) of the pressure-sensitive adhesive layer after the storage under the environment of 60° C. and 95% RH for 120 hours was calculated by using the following equation. The average value was calculated by setting the number of measurements (n number) twice.

"Moisture ratio of the pressure-sensitive adhesive layer (wt %)"="moisture content (μg) of the pressure-sensitive adhesive layer after storage under the environment of 60° C. and 95% RH for 120 hours"/("weight (μg) of the sample after storage under the environment of 60° C. and 95% RH for 120 hours"−"weight (μg) of the aluminum foil")×100

(Analysis Apparatus)

Coulometric titration moisture measuring apparatus: "CA-06 type" manufactured by Mitsubishi Chemical Corp.

Heating vaporization apparatus: "VA-06 type" manufactured by Mitsubishi Chemical Corp.

(Measuring Conditions)

Method: heating vaporization method/150° C. heating

Anode solution: aquamicron AKX

Cathode solution: aquamicron CXU (2) Shear Storage Elastic Modulus (85° C.) and Shear Storage Elastic Modulus (23° C.)

The laminate of the pressure-sensitive adhesive layers having the thickness of about 1.5 mm was prepared by laminating the pressure-sensitive adhesive layers of the double-sided pressure-sensitive adhesive sheets obtained in the Examples and the Comparative Examples, and was used as the sample.

The shear storage elastic modulus at 85° C. and shear storage elastic modulus at 23° C. were calculated by measuring the sample by using "Advanced Rheometric Expansion System (ARES)" manufactured by Rheometric Scientific Co., Ltd. under the condition of the frequency at 1 Hz, the temperature of −70 to 200° C. and the rising-temperature rate of 5° C./min.

(3) Peeling Distance (Constant-Load Peel Test)

The sample 12 for measurement (laminate of the double-sided pressure-sensitive adhesive sheet and the aluminum-deposited PET film) was prepared by laminating the aluminum-deposited PET film (trade name "SZ PET25A1", thickness: 25 μm, manufactured by REIKO Co., Ltd.) to the pressure-sensitive adhesive surface of one side of the double-sided pressure-sensitive adhesive sheet obtained in the Examples and the Comparative Examples, and cutting the film into tape pieces having the size of width 20 mm×length 60 mm.

The pressure-sensitive adhesive surface of the sample 12 for measurement (pressure-sensitive adhesive surface of the other side of the double-sided pressure-sensitive adhesive sheet) was laminated to the surface (center part) of the PET film of the polyethylene terephthalate plate 11 (PET plate (lamiante of the PET film (trade name "A4300", thickness of 125 μm) and the glass plate, manufactured by Toyobo Co., Ltd.), length of 100 mm×width of 30 mm, thickness of 2.0 mm), followed by treating in the autoclave under the condition of 50° C. and 5 atm for 15 min.

Subsequently, the PET plate 11 was horizontally placed so that the surface to which the sample 12 for measurement was laminated was the bottom surface by using the clamp (see FIGS. 1 and 2).

As shown in FIGS. 1 and 2, the sample 12 for measurement was peeled 5 mm longitudinally from the terminal end of the PET plate 11 in the length direction of the sample. The weight 13 of 100 g was hung with thread from the end of the sample 12 for measurement in the length direction (the peeled part), and the load of 100 gf (0.98 N) was vertically (downwardly) applied to the surface of the PET plate 11. The weight 13 was laminated to an end of the thread passing through the hole formed at the center part of the sample 12 for measurement in a width direction and at the part positioned at 5 mm from the end thereof in the length direction.

After the load was applied as described above, the sample was left standing for 3 hours under the condition of 23° C. and 50% RH. The peeling distance (to the PET plate) was obtained by measuring the distance (peeling distance) 16 of the sample 12 for measurement peeled from the PET plate 11 after the passage of 3 hours from initiation of measurement (while the sample was left standing for 3 hours).

The peeling distance 16 is the peeling distance of the sample 12 for measurement in the length direction, and indicates the distance 16 between the end position 14 where the double-sided pressure-sensitive adhesive sheet and the PET plate were closely contacted at the start of the measurement, and the end position 15 where the double-sided pressure-sensitive adhesive sheet and the PET plate were closely contacted after the passage of 3 hours (see FIGS. 2 and 3). The peeling distance 16 was measured by the distance at the center part of the sample 12 for measurement in the width direction.

The peeling distance (to the acrylic plate) was measured in the same manner, except that acrylic plate (PMMA plate, trade name "ACRYLITE MR-200", length 100 mm×width 30 mm, thickness of 1.5 mm, manufactured by Mitsubishi Rayon Co., Ltd.) was used instead of the PET plate.

The results are shown in the columns of "peeling distance to PET" and "peeling distance to acryl" in Table 1.

(4) Amount of the Extracted (meth)acrylic Acid Ion

The PET film ("LUMIRROR S10", thickness of 25 manufactured by Toray Industries Inc.) was laminated to the pressure-sensitive adhesive surface of one side of the double-sided pressure-sensitive adhesive sheet obtained in the Examples and the Comparative Examples, followed by cutting into sheet pieces having the size of width 10 cm×length 10 cm. Thereafter, the release liner was peeled and the sample in which the pressure-sensitive adhesive surface of only one side thereof was exposed was prepared (exposure area of the pressure-sensitive adhesive surface: 100 cm$^2$).

Subsequently, the sample was put in pure water (50 ml) having the temperature of 100° C., followed by boiling for 45 min and performing boiling extraction to obtain an extraction solution.

Subsequently, the total amount (unit: ng) of the acrylic acid ion and methacrylic acid ion in the obtained extraction solution was measured by using the ion chromatograph method (ion chromatography), and the total amount (amount of extracted (meth)acrylic acid ion, unit: ng/cm$^2$) of the acrylic acid ion and methacrylic acid ion per unit area of the pressure-sensitive adhesive surface (exposed pressure-sensitive adhesive surface) of the sample was calculated. In the case where the amount of the extracted (meth)acrylic acid ion was less than the detection limit (detection limit: 2.5 ng), the case was represented by "ND" in Table 1.

(Measuring Condition of Ion Chromatograph Method)

Analysis device: DX-320, manufactured by DIONEX Co., Ltd.

Separation column: Ion Pac AS15 (4 mm×250 mm)

Guard column: Ion Pac AG15 (4 mm×50 mm)

Removal system: ASRS-ULTRA (External mode, 100 mA)

Detector: electric conductivity detector

Eluent: 7 mM KOH (0 to 20 min)

45 mM KOH (20 to 30 min)

(eluent generator EG40 was used)

Flow rate of eluent: 1.0 ml/min

Injection amount of sample: 250 μl (5) Humidified Turbidity (Presence/Absence of White Turbidity Due to Humidification)

The release liner was peeled from the double-sided pressure-sensitive adhesive sheet obtained in the Examples and Comparative Examples, and the pressure-sensitive adhesive surface of one side of the double-sided pressure-sensitive adhesive sheet was laminated to the slide glass (trade name "MICRO SLIDE GLASS", lot No. "S", thickness of 1.3 mm, haze 0.1%, ground edges, manufactured by MATSU-NAMI GLASS IND., LTD.), and the pressure-sensitive adhesive surface of the other side thereof was laminated to the ITO film-formed surface of conductive PET film (trade name "ELECRYSTA V270L-THMP", manufactured by Nitto Denko Corp.) to prepare the sample having the layer structure of "slide glass/double-sided pressure-sensitive adhesive sheet (pressure-sensitive adhesive layer)/conductive PET film". The haze of the sample was measured under the environment of 23° C. and 50% RH by using the haze meter (trade name "HM-150", manufactured by MURAKAMI Color Research Laboratory), and the obtained haze data was used as the "initial haze".

Subsequently, the sample was stored under the environment of 60° C. and 95% RH (under the hygrothermal environment) for 120 hours. Thereafter, the sample was taken therefrom to the environment of 23° C. and 50% RH, and the following haze was measured: the haze immediately after the sample was taken therefrom (referred to as "haze (immediately after)"); the haze after the passage of 30 minutes from the sample was taken therefrom to the environment of 23° C. and 50% RH (referred to as "haze (after 30 min)"); the haze after the passage of 1 hour from the sample was taken therefrom to the environment of 23° C. and 50% RH (referred to as "haze (after 1 hour)"); and the haze after the passage of 2 hours from the sample was taken therefrom to the environment of 23° C. and 50% RH (referred to as "haze (after 2 hours)"). An increase width of the "haze (immediately after)" to the "initial haze" [=(haze (immediately after))−(initial haze)], an increase width of the "haze (after 30 min)" to the "initial haze" [=(haze (after 30 min))−(initial haze)], an increase width of the "haze (after 1 hour)" to the "initial haze" [=(haze (after 1 hour))−(initial haze)], and an increase width of the "haze (after 2 hours)" to the "initial haze" [=(haze (after 2 hours))−(initial haze)] were calculated, respectively, and the case where all was less than 5.0% (% point) was represented by "A" (there was no white turbidity due to humidification), and the case where any one was 5.0% or more (% point) was represented by "B" (there was white turbidity due to humidification). The results are shown in the column of "humidified turbidity" in Table 1.

(6) Durability (Foaming Release)

The film pieces having the size of 100 mm×100 mm were prepared by laminating the pressure-sensitive adhesive surface of one side of the double-sided pressure-sensitive adhesive sheet obtained in the Examples and the Comparative Examples to the ITO film-formed surface of the conductive film (trade name "ELECRYSTA V270L-THMP", manufactured by Nitto Denko Corp.) that was treated at 140° C. for 120 min beforehand.

The release liner was peeled from the film piece, and the pressure-sensitive adhesive surface of the other side thereof was laminated to the acrylic plate (trade name "ACRYLITE L", size: width 50 mm×length 100 mm, thickness of 1.0 mm, manufactured by manufactured by Mitsubishi Rayon Co., Ltd.), followed by bonding with pressure under the condition of linear pressure of 5 N/cm to prepare the sample having the layer structure of "conductive film/double-sided pressure-sensitive adhesive sheet (pressure-sensitive adhesive layer)/acrylic plate". Subsequently, the sample was aged under the condition of 50° C. and 24 hours.

The sample was put in the oven having the temperature of 85° C., followed by subjecting to heat treatment for 240 hours (heat resistance test). After the heat treatment, the occurrence of bubbles or lift-off was observed with an eye in the adhesive interface (interface between the pressure-sensitive adhesive layer and conductive film) of the sample. In addition, the hygrothermal treatment (hygrothermal resistance test) was performed under the condition of 60° C. and 95% RH for 250 hours, instead of the heat resistance test at 85° C., and the occurrence of bubbles or lift-off was observed in the adhesive interface of the sample.

With respect to the sample using the polycarbonate plate (PC plate) (polycarbonate plate not treated by hard coating; trade name "PC1111", size: width 50 mm×length 100 mm, thickness of 1.0 mm, manufactured by Teijin Kasei Co., Ltd.) instead of the acrylic plate, heat resistance test at 85° C. and hygrothermal resistance test at 60° C. and 95% RH were performed in the same manner, and the occurrence of bubbles or lift-off was observed in the adhesive interface of the sample.

The durability was evaluated according to the following evaluation standard, and the results are shown in the column of "durability (foaming release)" in Table 1.

Evaluation standard of durability: in the heat resistance test at 85° C. and the hygrothermal resistance test at 60° C. and 95% RH by using the acrylic plate, and the heat resistance test at 85° C. and the hygrothermal resistance test at 60° C. and 95% RH by using the PC plate, in the case where bubbles or lift-ups were not observed in all of the tests, the durability was evaluated as "good", and in the case where bubbles or lift-ups were observed in any one of the tests, the durability was evaluated as "poor".

(7) Corrosion Resistance (Change in ITO Resistance Value)

The PET film (trade name "LUMIRROR S-10 #25", thickness of 25 μm, manufactured by Toray Industries Inc.) was laminated to the pressure-sensitive adhesive surface of one side of the double-sided pressure-sensitive adhesive sheet obtained in the Examples and the Comparative Examples, followed by cutting into pieces having the size of width 20 mm×length 50 mm, to be used as the sample.

Figure 4:
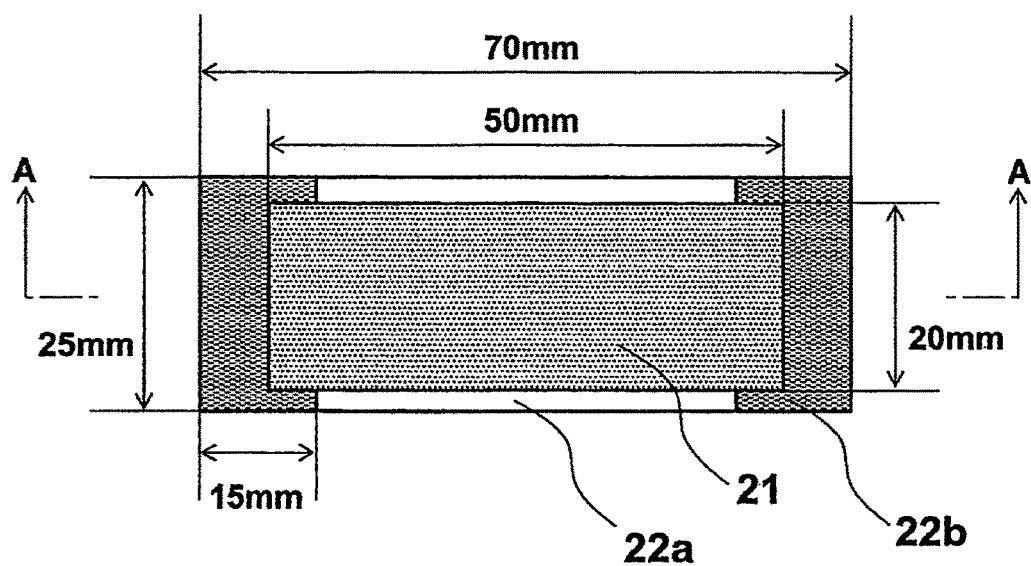
FIG. 4 is a schematic view (plan view) showing a sample for resistance measurement used in evaluating corrosion resistance in Examples.
Figure 5:
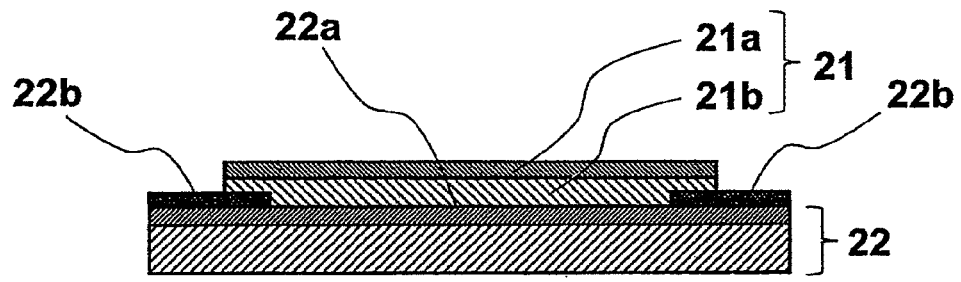
FIG. 5 is a schematic view (A-A cross-sectional view of FIG. 4) showing a sample for resistance measurement used in evaluating corrosion resistance in the Examples.

As shown in FIGS. 4 and 5, the silver paste were coated on both sides of the conductive PET film 22 (trade name "ELECRYSTA P-400L TNMP", manufactured by Nitto Denko Corp.) (size: length 70 mm×width 25 mm) in the width of 15 mm, followed by laminating the pressure-sensitive adhesive surface of the sample 21, from which the release liner was peeled, to the conductive surface thereof (ITO film-formed surface 22a side) to prepare the laminate (laminate of the sample 21 and the conductive PET film 22) (sample for resistance measurement). After the laminate was left standing for 24 hours under the environment of 23° C., it was left standing for 250 hours under each of the environment of 60° C. and 95% RH and the environment of 80° C., and then, the ratio (%) of the "resistance value after the laminate was left standing at 60° C. and 95% RH for 250 hours" to the "resistance value immediately after the lamination" [=(resistance value after the laminate was left standing at 60° C. and 95% RH for 250 hours)/(resistance value immediately after the attachment)×100(%)], and the ratio (%) of the "resistance value after the laminate was left standing at 80° C. for 250 hours" to the "resistance value immediately after the attachment" [=(resistance value after the laminate was left standing at 80° C. for 250 hours)/(resistance value immediately after the attachment)×100 (%)] were measured, respectively. The resistance value was measured by attaching electrodes to the silver paste parts 22b of both ends of the laminate by using "3540 Miliohm Hightester" manufactured by Hioki Electric Co., Ltd.

If both of the ratio of the "resistance value after the laminate was left standing at 60° C. and 95% RH for 250 hours" to the "resistance value immediately after the attachment", and the ratio (%) of the "resistance value after the laminate was left standing at 80° C. for 250 hours" to the "resistance value immediately after the attachment" were less than 120%, the corrosion resistance was evaluated as "good", and if any one of the ratios was 120% or more, the corrosion resistance was evaluated as "faulty". The results are shown in the column of "corrosion resistance" in Table 1.

The same test was performed by using the only conductive PET film to which the pressure-sensitive adhesive sheet was not laminated, as the blank, and as a result, the ratio of the "resistance value after the laminate was left standing for 250 hours" to the "resistance value before the laminate was left standing for 250 hours" was 110% at 80° C. and 120% at 60° C. and 95% RH, respectively.

(8) Step Absorbability

Figure 6:
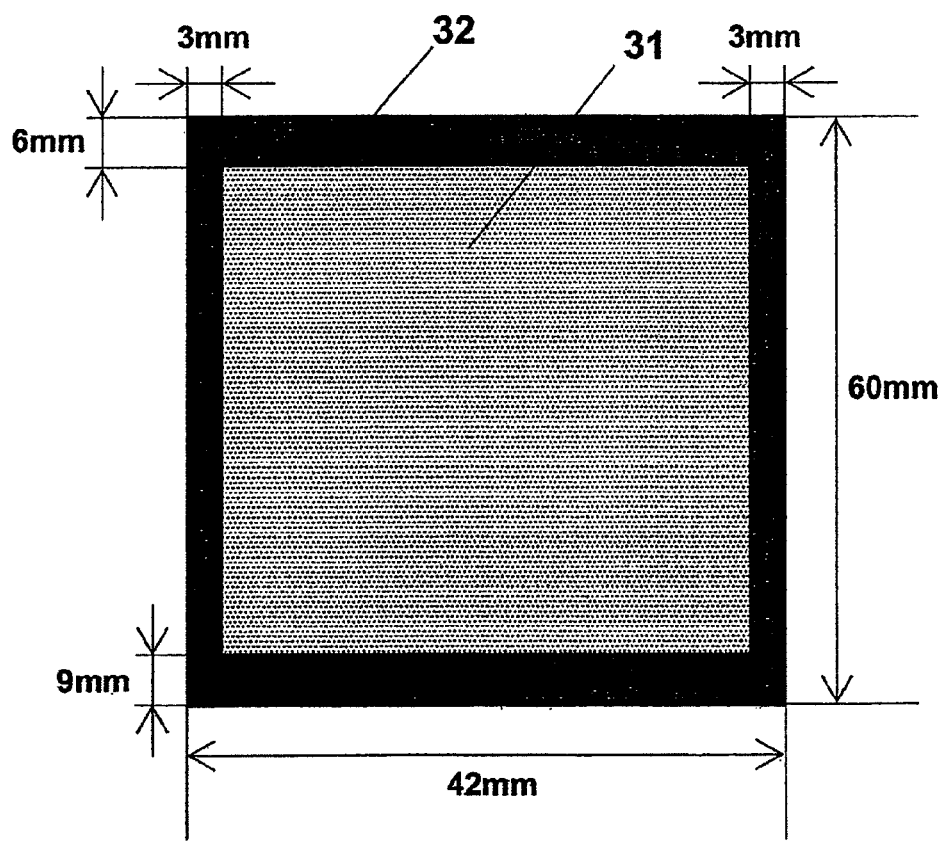
FIG. 6 is a schematic view (plan view observed from a side of a black print layer) of a PET film having the black print layer used in evaluating the step absorbability in Examples.

Black printing was performed three times on one surface of the PET film (trade name, "A4100", thickness of 188 μM, manufactured by Toyobo Co., Ltd.) by screen printing with a thickness of 4 μM to prepare the PET film (size: length 60 mm×width 42 mm) having the frame-shaped black print layer as shown in FIG. 6 (print layer thickness: 12 μm, external size: length 60 mm×width 42 mm).

Subsequently, the pressure-sensitive adhesive surface (pressure-sensitive adhesive surface of one side thereof) of the double-sided pressure-sensitive adhesive sheet (size: length 60 mm×width 42 mm) obtained in the Examples and the Comparative Examples was laminated to the surface of the PET film having the black print layer on the side of the black print layer, by the laminator (linear pressure: 5 kg/cm).

Figure 7:
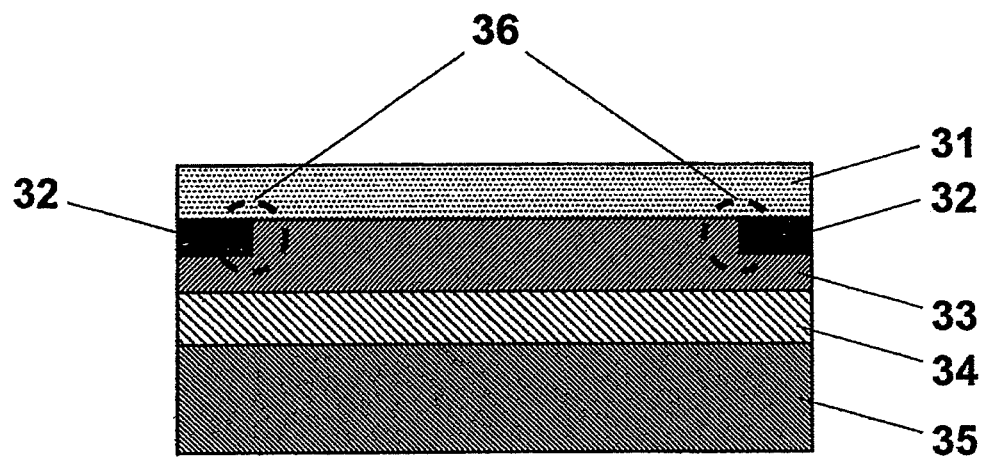
FIG. 7 is a schematic view (cross-sectional view) of a measuring sample used in evaluation of the step absorbability in Examples.

The release liner was peeled from the laminate of the PET film having the black print layer and the double-sided pressure-sensitive adhesive sheet, and the pressure-sensitive adhesive surface of the laminate was laminated to the PET film (trade name "A4300", thickness 125 μm, manufactured by Toyo Spinning, Co., Ltd.) (size: length 60 mm×width 42 mm) which had been laminated to the glass substrate beforehand, by the laminator (linear pressure: 5 kg/cm) to prepare the sample for measurement (see FIG. 7).

After the sample for measurement was treated under the condition of 50° C. and 0.5 MPa for 15 min by using the autoclave, the occurrence of bubbles or lift-ups at the step part was observed with an eye from the glass substrate side. The case where the bubbles or lift-ups were not observed at the step part was evaluated as "A" (good step absorbability), and the case where the bubbles or lift-ups were observed was evaluated as "B" (poor step absorbability). The results are shown in the column of "step absorbability" in Table 1.

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Acrylic Polymer | Monomer | BA | — | — | 76 | 72 | — | — | — | — |
| | Composition | 2EHA | 63 | 63 | — | — | 72 | 72 | 71 | 77 |
| | (part by weight) | NVP | 15 | 15 | 6 | 10 | 15 | — | 15 | 3 |
| | | MMA | 9 | 9 | 5 | 5 | — | 15 | 9 | 3 |
| | | HEA | 13 | 13 | 13 | 13 | 13 | 13 | 5 | 13 |
| Additive | TAKENATE D110N | | 0.3 | 0.5 | 0.5 | 0.5 | 0.5 | 0.5 | 0.5 | 0.5 |
| (part by weight) | EDP-300 | | 0.2 | 0.2 | 0.2 | 0.2 | 0.2 | 0.2 | 0.2 | 0.2 |
| based on 100 parts by weight of acrylic polymer | KBM-403 | | 0.15 | 0.15 | 0.15 | 0.15 | 0.15 | 0.15 | 0.15 | 0.15 |
| Pressure-sensitive | Thickness [μm] | | 50 | 50 | 50 | 50 | 50 | 50 | 50 | 50 |
| adhesive layer | Moisture rate [%] | | 1.0 | 1.0 | 0.9 | 0.9 | 1.2 | 0.8 | 0.55 | 1.0 |

TABLE 1-continued

|  |  | Example 1 | Example 2 | Example 3 | Example 4 | Comparative Example 1 | Comparative Example 2 | Comparative Example 3 | Comparative Example 4 |
|---|---|---|---|---|---|---|---|---|---|
|  | Gel fraction [%] | 57 | 70 | 70 | 70 | 70 | 70 | 70 | 70 |
|  | Weight average molecular weight (Mw) of sol matter | 200,000 | 150,000 | 180,000 | 220,000 | 400,000 | 130,000 | 270,000 | 300,000 |
|  | Molecular weight distribution (Mw/Mn) of sol matter | 3.5 | 3.6 | 3.8 | 3.4 | 3.5 | 4.0 | 3.7 | 3.9 |
|  | Shear storage elastic modulus (85° C.) [× $10^4$ Pa] | 9.7 | 9.7 | 10.2 | 11.0 | 5.2 | 6.0 | 8.7 | 4.6 |
|  | Shear storage elastic modulus (23° C.) [× $10^5$ Pa] | 3.0 | 3.1 | 4.7 | 4.5 | 1.9 | 2.6 | 2.9 | 1.5 |
| Pressure-sensitive adhesive sheet | Peeling distance to acryl [mm] to PET | 3<br>7 | 5<br>10 | 3<br>9 | 3<br>5 | 60<br>60 | 18<br>34 | 4<br>8 | 60<br>60 |
|  | Durability (foaming release) | good | good | good | good | poor | poor | good | poor |
|  | Step absorbability | A | A | A | A | A | A | A | A |
|  | Humidified turbidity | A | A | A | A | A | A | B | A |
|  | Amount of extracted (meth)acrylic acid ion [ng/cm$^2$] | ND | ND | ND | ND | ND | ND | ND | ND |
|  | Corrosion resistance | good | good | good | good | good | good | good | good |

As apparent from Table 1, in the double-sided pressure-sensitive adhesive sheet of the present invention (Examples), the white turbidity was not caused by humidification. Foaming (bubbles) or releasing did not occur under the high temperature environment as well as high temperature and high humidity environment, and the durability was also excellent. On the other hand, in the case where the peeling distance (to acryl) and/or peeling distance (to PET) of the double-sided pressure-sensitive adhesive sheet were excessively large (Comparative Examples 1, 2 and 4), the durability was poor, and in the case where the moisture ratio of the pressure-sensitive adhesive layer after storage under the environment of 60° C. and 95% RH for 120 hours was excessively low (Comparative Example 3), the white turbidity occurred due to humidification.

While the invention has been described in detail and with reference to specific embodiments thereof, it will be apparent to one skilled in the art that various changes and modifications can be made therein without departing from the spirit and scope thereof.

This application is based on Japanese Patent Application No. 2010-236316 filed on Oct. 21, 2010, and the entire subject matter of which is incorporated herein by reference.

The present invention provides the following optical pressure-sensitive adhesive sheet, optical film and display device.

(1) An optical pressure-sensitive adhesive sheet, comprising:

a pressure-sensitive adhesive layer in which a moisture ratio after storage under an environment of 60° C. and 95% RH for 120 hours is 0.65 wt % or more, and a shear storage elastic modulus at 85° C. which is measured by a dynamic viscoelastic measurement is $5.0 \times 10^4$ to $5.0 \times 10^5$ Pa, wherein a peeling distance measured by the following constant-load peel test is 30 mm or less when an adherend is a polyethylene terephthalate plate, and the peeling distance measured by the following constant-load peel test is 30 mm or less when the adherend is an acrylic plate:

constant-load peel test:

a surface of the pressure-sensitive adhesive layer of the pressure-sensitive adhesive sheet having a size of 20 mm in width and 60 mm in length is laminated to one surface of the adherend, followed by treating in an autoclave under a condition of 50° C. and 5 atm for 15 min, and subsequently, a load of 100 gf in a direction which is vertical to the surface of the adherend is applied to an end of the pressure-sensitive adhesive sheet in a length direction under a condition of 23° C. and 50% RH, and the peeling distance of the pressure-sensitive adhesive sheet after the passage of 3 hours is measured.

(2) The optical pressure-sensitive adhesive sheet according to (1), wherein a total amount of an acrylic acid ion and methacrylic acid ion which are extracted with pure water under a condition of 100° C. and 45 min, which is measured by an ion chromatograph method, is 20 ng/cm$^2$ or less per unit area of the pressure-sensitive adhesive layer.

(3) The optical pressure-sensitive adhesive sheet according to (1) or (2), wherein a gel fraction of the pressure-sensitive adhesive layer is 40 to 95%.

(4) The optical pressure-sensitive adhesive sheet according to any one of (1) to (3), wherein the pressure-sensitive adhesive layer comprises an acrylic polymer including, as a monomer component, a methyl methacrylate in an amount of 5 to 20 wt % based on a total amount (100 wt %) of the monomer component constituting the acrylic polymer.

(5) The optical pressure-sensitive adhesive sheet according to (4), wherein the acrylic polymer includes, as a monomer component, a hydroxyl group-containing monomer in an amount of 10 to 25 wt % based on a total amount (100 wt %) of the monomer component constituting the acrylic polymer.

(6) An optical film comprising the optical pressure-sensitive adhesive sheet according to any one of (1) to (5).

(7) A display device comprising the optical pressure-sensitive adhesive sheet according to any one of (1) to (5).

DESCRIPTION OF REFERENCE NUMERALS AND SIGNS

11: PET plate or acrylic plate
12: Pressure-sensitive adhesive sheet (or sample for measurement (pressure-sensitive adhesive sheet/PET film))
13: Weight
14: End position 14 where the pressure-sensitive adhesive sheet (or sample fore measurement) and the PET plate or acrylic plate are closely contacted at the start of measurement
15: End position 15 where the pressure-sensitive adhesive sheet (or sample for measurement) and the PET plate or acrylic plate are closely contacted after the passage of 3 hours
16: Peeling distance 21: Sample
21a: PET film
21b: Pressure-sensitive adhesive sheet (double-sided pressure-sensitive adhesive sheet)
22: Conductive PET film
22a: ITO film-formed surface of conductive PET film
22b: Silver paste parts in conductive PET film
31: PET film
32: Black print layer
33: Double-sided pressure-sensitive adhesive sheet (acrylic pressure-sensitive adhesive layer)
34: PET film
35: Glass substrate
36: Step part

What is claimed is:

1. An optical pressure-sensitive adhesive sheet, comprising:
a pressure-sensitive adhesive layer in which a moisture ratio after storage under an environment of 60° C. and 95% RH for 120 hours is 0.65 wt % or more, and a shear storage elastic modulus at 85° C. which is measured by a dynamic viscoelastic measurement is $5.0 \times 10^4$ to $5.0 \times 10^5$ Pa,
wherein a peeling distance measured by the following constant-load peel test is 30 mm or less when an adherend is a polyethylene terephthalate plate, and the peeling distance measured by the following constant-load peel test is 30 mm or less when the adherend is an acrylic plate:
constant-load peel test:
a surface of the pressure-sensitive adhesive layer of the pressure-sensitive adhesive sheet having a size of 20 mm in width and 60 mm in length is laminated to one surface of the adherend, followed by treating in an autoclave under a condition of 50° C. and 5 atm for 15 min, and subsequently, a load of 100 gf in a direction which is vertical to the surface of the adherend is applied to an end of the pressure-sensitive adhesive sheet in a length direction under a condition of 23° C. and 50% RH, and the peeling distance of the pressure-sensitive adhesive sheet after the passage of 3 hours is measured;
wherein the pressure-sensitive adhesive layer comprises an acrylic polymer including, as a monomer component, a methyl methacrylate in an amount of 5 to 20 wt %, 2-ethylhexyl acrylate or n-butyl acrylate in an amount of 35 to 80 wt %, a hydroxyl group-containing monomer in an amount of 10 to 25 wt %, and a hetero ring-containing vinyl monomer in an amount of 5 to 20 wt %, each based on a total amount (100 wt %) of the monomer component constituting the acrylic polymer;
wherein the hydroxyl group-containing monomer is at least one selected from the group consisting of 2-hydroxyethyl acrylate, 4-hydroxybutyl acrylate and 2-hydroxypropyl acrylate,
wherein the hetero ring-containing vinyl monomer is at least one N-vinyl cyclic amide selected from the group consisting of N-vinyl-2-pyrrolidone, N-vinyl-2-piperidone and N-vinyl-2-caprolactam,
wherein the pressure-sensitive adhesive layer has a thickness of 10 to 250 μm; and
wherein the acrylic polymer has a weight average molecular weight of 400,000 to 2,000,000.

2. The optical pressure-sensitive adhesive sheet according to claim 1, wherein a total amount of an acrylic acid ion and methacrylic acid ion which are extracted with pure water under a condition of 100° C. and 45 min, which is measured by an ion chromatograph method, is 20 ng/cm$^2$ or less of the pressure-sensitive adhesive layer.

3. The optical pressure-sensitive adhesive sheet according to claim 1, wherein a gel fraction of the pressure-sensitive adhesive layer is 40 to 95%.

4. The optical pressure-sensitive adhesive sheet according to claim 1, wherein a glass transition temperature (Tg) of the acrylic polymer is from −40 to 10° C.

5. The optical pressure-sensitive adhesive sheet according to claim 1, wherein the acrylic polymer has a weight average molecular weight of 500,000 to 1,500,000.

6. The optical pressure-sensitive adhesive sheet according to claim 1, wherein the hydroxyl group-containing monomer is 2-hydroxyethyl acrylate in an amount of 10 to 25 wt % based on the total amount (100 wt %) of the monomer component constituting the acrylic polymer and the hereto ring-containing monomer is N-vinyl-2-pyrrolidone in an amount of 5 to 20 wt % based on the total amount (100 wt %) of the monomer component constituting the acrylic polymer.

7. The optical pressure-sensitive adhesive sheet according to claim 2, wherein a gel fraction of the pressure-sensitive adhesive layer is 40 to 95%.

8. An optical film comprising the optical pressure-sensitive adhesive sheet according to claim 1.

9. A display device comprising the optical pressure-sensitive adhesive sheet according to claim 1.

10. An optical film comprising the optical pressure-sensitive adhesive sheet according to claim 2.

11. An optical film comprising the optical pressure-sensitive adhesive sheet according to claim 3.

12. An optical film comprising the optical pressure-sensitive adhesive sheet according to claim 7.

* * * * *